(12) United States Patent
Madey et al.

(10) Patent No.: US 9,100,131 B2
(45) Date of Patent: Aug. 4, 2015

(54) SINGLE PHOTON SOURCE

(76) Inventors: John Madey, Honolulu, HI (US); Eric Szarmes, Honolulu, HI (US); Pui Kwong Lam, Honolulu, HI (US); Shahab Etemad, Warren, NJ (US); Nicholas Peters, Laurel, MD (US); Zhensheng Jia, Morganville, NJ (US)

( * ) Notice: Subject to any disclaimer, the term of this patent is extended or adjusted under 35 U.S.C. 154(b) by 1283 days.

(21) Appl. No.: 12/777,201

(22) Filed: May 10, 2010

(65) Prior Publication Data

US 2010/0289408 A1    Nov. 18, 2010

Related U.S. Application Data

(60) Provisional application No. 61/177,175, filed on May 11, 2009.

(51) Int. Cl.
*H01J 25/50* (2006.01)
*H04B 10/70* (2013.01)

(52) U.S. Cl.
CPC ...................................... *H04B 10/70* (2013.01)

(58) Field of Classification Search
USPC .................. 315/39.51; 977/933; 326/104; 250/493.1
See application file for complete search history.

(56) References Cited

PUBLICATIONS

Bergmann, K., et al., "Coherent Population Transfer Among Quantum States of Atoms and Molecules", RMP Colloquia, Reviews of Modern Physics, vol. 70, No. 3, pp. 1003-1025, Jul. 1998.
Crandall, R.S., et al., "Crystallization of Electrons on the Surface of Liquid Helium", Physics Letters, vol. 34A, No. 7, 2 pages, Apr. 19, 1971.
Eisaman, M. D., et al., Single-Photon Sources and Detectors, AIP Review of Scientific Instruments, http://scitation.aip.org/content/aip/journal/rsi/82/7/10.1063/1.3610677, accessed Feb. 22, 2015, 61 pages.
Goy, P., et al., "Observation of Cavity-Enhanced Single-Atom Spontaneous Emission", Physical Review Letters, vol. 50, No. 24, pp. 1903-1906, Jun. 13, 1983.
Hanni, R.S., et al., "Shielding by an Electron Surface Layer", Physical Review B, vol. 17, No. 4, pp. 1976-1983, Feb. 13, 1978.
Hulet, R.G., et al., "Inhibited Spontaneous Emission by a Rydberg Atom", Physical Review Letters, vol. 55, No. 20, pp. 2137-2140, Nov. 11, 1985.
Namekata, N., et al., "Single-Photon Source for Telecommunication Wavelengths Using Nondegenerate Photon Pairs from a Periodically Poled LiNbO3 Waveguide", Japanese Journal of Applied Physics, vol. 46, No. 6A, pp. 3410-3415, 2007.
Robert, I., et al., "Towards a Single-Mode Single Photon Source Based on Single Quantum Dots", Journal of Luminescence, 94-95, pp. 797-803, 2001.

(Continued)

*Primary Examiner* — Douglas W Owens
*Assistant Examiner* — Jonathan Cooper
(74) *Attorney, Agent, or Firm* — Knobbe, Martens, Olson & Bear, LLP

(57) ABSTRACT

A photon source capable of emitting, for example, a single photon or a single pair of photons on demand. The photon source may include an excitation region where a single instance of a quantum system is excited using excitation energy. A Stimulated Raman Adiabatic Passage (STIRAP) technique can be used for exciting the quantum system to a desired energy level. The photon source may include a photon emission region physically displaced from the excitation region. A transport device can be used for controllably moving an excited quantum system from the excitation region to the photon emission region. The photon emission region may include a resonant cavity tuned to the de-excitation frequency of the quantum system for inducing de-excitation of the quantum system and emission of a photon. The photon emission resonant cavity may be switchably coupled to an output port by a tunable resonant cavity coupling device.

24 Claims, 20 Drawing Sheets

(56) References Cited

PUBLICATIONS

Rousseau, E., et al., "Addition Spectra of Wigner Islands of Electrons on Superfluid Helium", Physical Review B79, 045406, pp. 1-10, 2009.

Ryabinina, M.V., et al., "Laser-Induced Antiproton-Positron Recombination in Traps", Nuclear Instruments and Methods in Physics Research B 214, pp. 35-39, 2004.

Vitanov, N.V., et al., "Laser-Induced Population Transfer by Adiabatic Passage Techniques", Annu. Rev. Phys. Chem. 52:763-809, 2001.

SINGLE PHOTON SOURCE

CROSS-REFERENCE TO RELATED APPLICATIONS

This application claims priority to U.S. Provisional Patent Application 61/177,175, entitled "A SOLID-STATE DETERMINISTIC SINGLE PHOTON SOURCE," and filed May 11, 2009, the entirety of which is hereby incorporated by reference.

BACKGROUND OF THE INVENTION

1. Field of the Invention

The field of the invention relates to photon sources for use in, for example, quantum information processing applications.

2. Description of the Related Art

Single photon sources are useful devices for quantum information processing applications, including, for example quantum computing and quantum cryptography. In the past, optical sources that emit very weak pulses have been used to attempt to generate single photons on demand. A difficulty associated with such devices is that the statistical properties associated with their photon emission results in a relatively large amount of uncertainty as to the precise moment that a photon will be emitted. There is also a relatively large window of time following a demand for production of a photon in which the photon may actually be emitted.

Moreover, attempts to reduce the delay between the time a photon is demanded and the time it is emitted, for example to increase the rate at which photons can be provided, can increase the probability of delivering multiple photons at a time instead of a single photon. Thus, maintaining the probability of multiple photon generation below an acceptable threshold may require longer intervals between generated photons and, hence, slower clock rates. There is an inverse relationship between the rate at which these devices are operated and their ability to effectively provide single photons on demand. There remains a need for improved single photon sources.

SUMMARY OF THE INVENTION

In some embodiments, a single photon source comprises: an electron excitation region comprising a material capable of supporting an electron in a bound surface state, the electron excitation region further comprising an electrode that is configured to create a potential well for confining a single bound surface state electron in the electron excitation region; an electron emitter that is configured to emit one or more electrons towards the potential well created by the electrode of the electron excitation region; a light source coupled to the electron excitation region for exciting the bound surface state electron from a ground state energy level to a first excited energy level, the light source being configured to excite the bound surface state electron to the first excited energy level using light energy that corresponds to the energy gap between the ground state energy level and a second excited energy level, and using light energy that corresponds to the energy gap between the second excited energy level and the first excited energy level; a photon emission resonant cavity that is displaced from the electron excitation region, the photon emission resonant cavity having a resonance that corresponds to the energy gap between the first excited energy level and the ground state energy level; and a transport device coupled between the electron excitation region and the photon emission resonant cavity, the transport device comprising a plurality of electrodes for creating a movable potential well for physically transporting the bound surface state electron from the electron excitation region to the photon emission resonant cavity.

In some embodiments, an apparatus for providing a photon on demand comprises: a quantum system excitation region configured to spatially localize a quantum system; a source of excitation energy coupled to the quantum system excitation region, the source of excitation energy being configured to excite the quantum system from a first energy level to a second energy level; a photon emission region that is physically displaced from the quantum system excitation region, the photon emission region being configured to induce the excited quantum system to emit a photon by dropping from the second energy level; and a transport device that is configured to controllably, physically transport the excited quantum system from the quantum system excitation region to the photon emission region.

In some embodiments, a method for providing a photon on demand comprises: receiving a command to emit a photon; providing a single quantum system in an excitation region; exciting the quantum system from a first energy level to a second energy level; controllably, physically transporting the excited quantum system from the excitation region to a photon emission region; inducing the excited quantum system to emit a photon by de-excitation; and extracting the photon to an output port.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

Various embodiments will be described hereinafter with reference to the accompanying drawings. These embodiments are illustrated and described by example only, and are not intended to limit the scope of the disclosure.

DETAILED DESCRIPTION OF THE PREFERRED EMBODIMENT

A useful element for performing functions in quantum information systems, such as quantum computing and quantum cryptography, is a source of light that will reliably and deterministically emit, on demand, a specified number of photons (e.g., one and only one photon, or alternatively only a pair of photons, etc.) per demand. The following disclosure describes various embodiments of a deterministic photon source with reduced statistical uncertainty in regards to the number and timing of photon emission. In some embodiments, the deterministic photon source is capable of providing single photons on demand into, for example, specific spatial and frequency modes with, for example, picosecond time resolution at gigahertz clock rates.

Figure 1A:
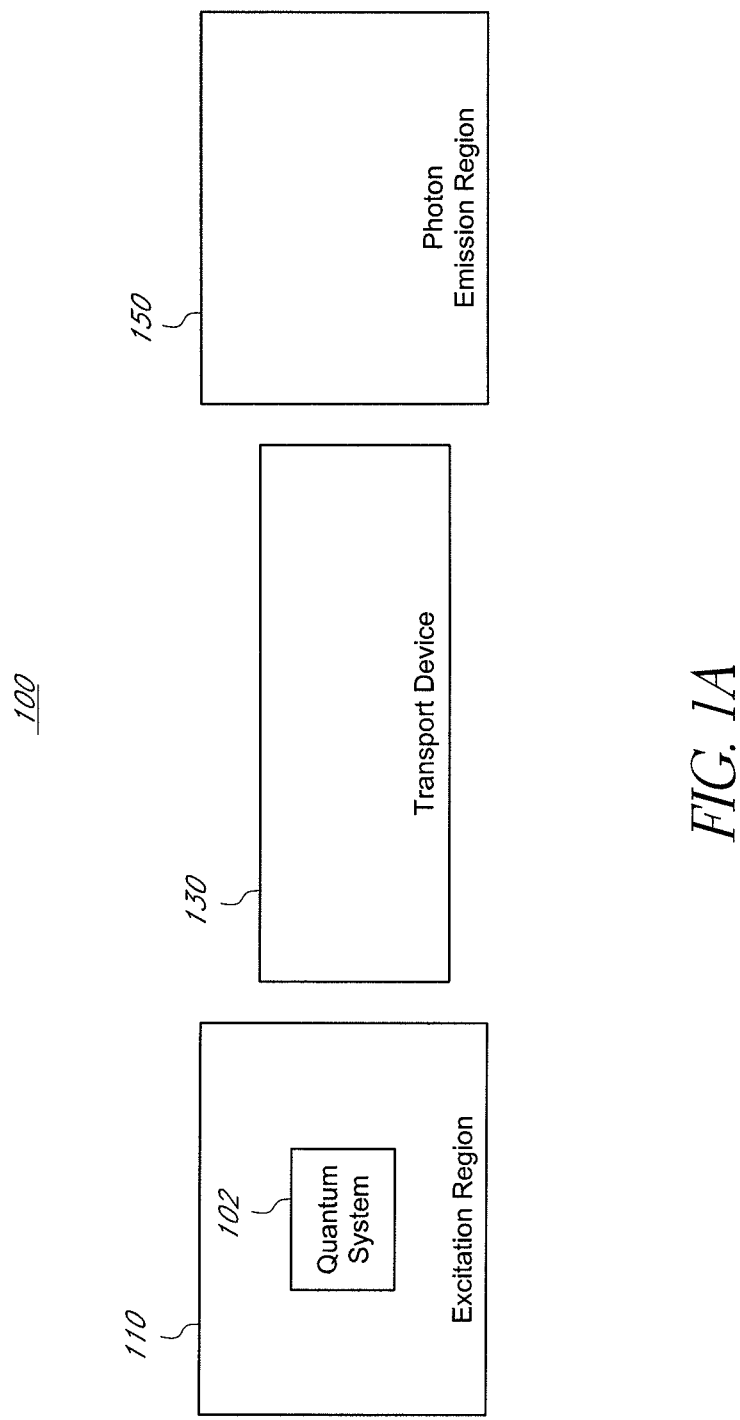
FIG. 1A illustrates an embodiment of a single photon source that has a quantum system located in an excitation region.

FIG. 1A illustrates an embodiment of a single photon source 100 that has a quantum system 102 located in an excitation region 110. In some embodiments, the quantum system 102 has discrete quantum energy levels in which it can exist, including, for example, a ground state energy level and one or more excited energy levels. These energy levels can be represented by n=1, 2, 3 . . . , where n is a positive integer and where n=1 refers to the ground energy level.

The quantum system can be, for example, a neutral atom, a positive or negative ion, or a bound surface state electron, as described further herein. Other quantum systems can also be used. In some embodiments, it is advantageous for the selected quantum system to be controllably transportable, to have well-defined energy levels, and to have a dipole moment capable of satisfactorily coupling to an output cavity, as described herein. In some embodiments, it is also advantageous for the quantum system to have an excited state with a spontaneous lifetime that is large in comparison to a transport time for physically moving the quantum system from an excitation region to a photon emission region, as described herein.

In some embodiments, the quantum system 102 is spatially localized in the excitation region 110 using, for example, a potential well, as described herein. The characteristics of the potential well, including, for example, its depth and location, can be controllable. The potential well can be created by electrostatic fields and/or time-varying electric fields (e.g., RF fields). In some embodiments, the quantum system can be spatially localized in a quadrupole ion trap. A variety of potential wells can be used depending upon the type of quantum system 102.

During operation of the single photon source 100, the quantum system 102 is raised to an excited energy level in the excitation region 110. A variety of methods can be used to excite the quantum system 102. In some embodiments, the chosen excitation method is one that can reliably excite the quantum system 102 to a specified energy level with a very high degree of certainty.

In some embodiments, the excited quantum system 102 is physically moved from the excitation region 110 to a photon emission region 150 where the quantum system 102 becomes de-excited and emits a photon 104. The movement of the quantum system 102 from the excitation region 110 to the photon emission region 150 can be accomplished using a transport device 130. The mechanism for transport can be, for example, a moving potential well created by a series of electrodes, or a quadrupole ion trap.

In some embodiments, the excited state of the quantum system 102 has a spontaneous lifetime that is greater than the transit time involved in physically moving the quantum system 102 (e.g., over macroscopic distances) from the excitation region 110 to the photon emission region 150. This characteristic allows the excited quantum system 102 to reach the designated photon emission region 150 without spontaneously emitting the photon 104 while in transit. In some embodiments, the transport device 130 is designed such that the transit time is less than $1/10$ of the spontaneous lifetime of the excited state, or less than $1/100$ of the spontaneous lifetime, or less than $1/1000$ of the spontaneous lifetime, though other transit times can also be used.

In some embodiments, the excitation region 110 of the single photon source 100 is designed so as to inhibit the quantum system 102 from becoming de-excited once it has been excited to the desired energy level. For example, in some embodiments, the excitation region 110 is designed so as to lengthen the amount of time that the quantum system 102 can exist in a metastable excited state beyond the normal spontaneous lifetime of the excited state. This can be done, for example, by carefully selecting the size and shape of the excitation region 110, the material(s) it is made of, and/or by selecting other properties of the excitation region. Moreover, in some embodiments the transport device 130 can be designed to inhibit de-excitation of the excited state while in transit. For example, the transport device 130 can be an optical structure that does not support photons at the de-excitation frequency of the excited state. In some embodiments, however, particularly where the spontaneous lifetime of the excited quantum system is sufficiently long, as described herein, the excitation region 110 and/or the transport device 130 need not necessarily be designed to slow the transition rate of the quantum system 102.

Figure 1B:
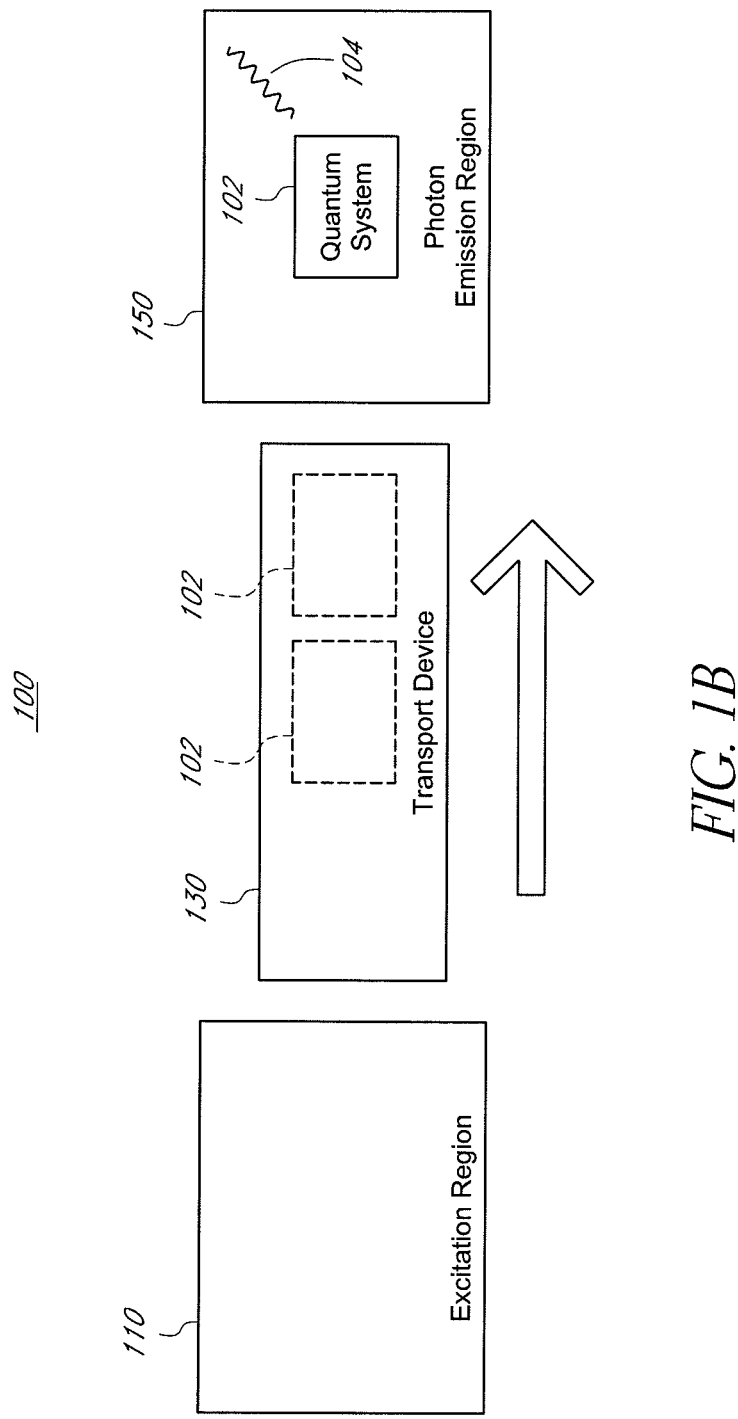
FIG. 1B illustrates the single photon source of FIG. 1A after the quantum system has been physically moved to a photon emission region.

FIG. 1B illustrates the single photon source 100 of FIG. 1A after the quantum system 102 has been physically moved to the photon emission region 150. In some embodiments, the excitation region 110 and the photon emission region 150 are coupled together by the transport device 130. As illustrated in FIG. 1B, the transport device 130 moves the quantum system 102 (represented in the transport device 130 with dotted lines to delineate motion) to the photon emission region 150. In the photon emission region, the excited quantum system 102 transitions from an excited energy level (e.g., n=2) to a lower energy level (e.g., n=1) and emits a photon 104 as part of this de-excitation process.

In some embodiments, for example where the quantum system 102 occupies a metastable excited energy level, the photon emission region 150 is designed to induce the quantum system 102 to transition to a lower energy level in a length of time that is less than the normal spontaneous lifetime of the metastable state. This can be accomplished using, for example, the Purcell effect to reduce the amount of statistical variation that would otherwise be associated with the timing of de-excitation of the excited quantum system 102. For example, the quantum system 102 could be transported to the photon emission region 150 and be simply left to spontaneously emit the photon 104 according to its normal spontaneous lifetime. However, in this approach, there may be an unacceptable amount of uncertainty in the timing of emission of the photon 104. This uncertainty could place unacceptable restrictions on the rate at which the single photon source is able to produce single photons on demand. This uncertainty can be reduced by inducing de-excitation of the excited state (e.g., using the Purcell effect) in an amount of time that is less than, for example, $1/10$ of the normal spontaneous lifetime, $1/100$ of the normal spontaneous lifetime, or $1/1000$ of the normal spontaneous lifetime. Inducement of de-excitation of the excited quantum system 102 using the Purcell effect can be accomplished, for example, by carefully selecting the size and shape of the photon emission region 150, its material(s), and/or other properties.

In some embodiments, however, for example where the spontaneous lifetime of the excited state is relatively short, it may not be necessary to design the photon emission region 150 to induce the transition to a lower energy level. The deterministic single photon source 100 is still advantageous even without inducement of de-excitation of the quantum system 102 in the photon emission region 150 because the source can nevertheless provide a photon 104 with a high degree of certainty in spite of any increased uncertainty in the actual timing of the emission of that photon 104 that may result from not inducing de-excitation.

In some embodiments, the excitation region 110 and the photon emission region 150 are physically separate. This allows opportunities for suppressing sources of optical noise by placing frequency and/or spatial filters at points, for example, between the excitation region 110 and the photon emission region 150, or at the output of the single photon source, as described herein. This physical separation may also allow the excitation region 110 to be designed with properties that, for example, inhibit the excited quantum system 102 from emitting the photon 104 before it is demanded, while the photon emission region 150 can be designed with different properties that, for example, induce the excited quantum system 102 to emit the photon 104.

In some embodiments, however, the excitation region 110 and the photon emission region 150 may be coincident such that the quantum system 102 is excited and de-excited in substantially the same physical area. This can be accomplished, for example, in embodiments where the properties of the region can be controllably varied so as to, for example, first not encourage de-excitation of the excited quantum system 102 and then later to encourage de-excitation when a photon is demanded. Such embodiments may not, however, fully benefit from the increased noise immunity that results from physical separation of the excitation region 110 and the photon emission region 150, as described herein.

Figure 2A:
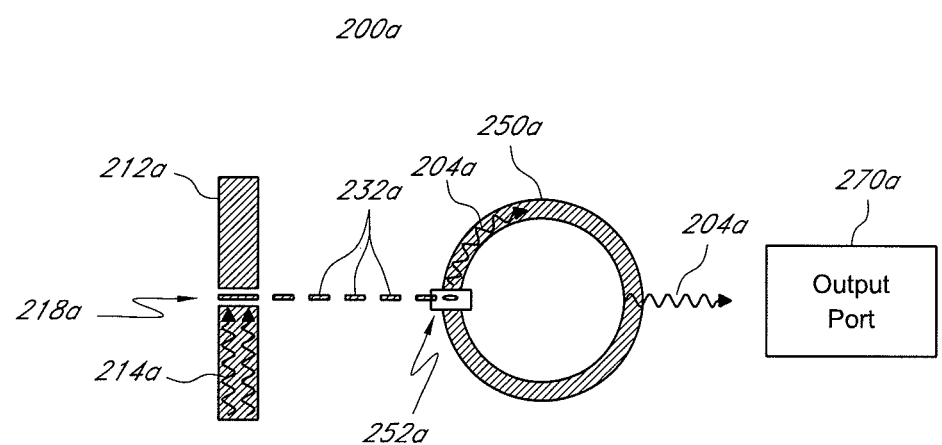
FIG. 2A illustrates an embodiment of a single photon source.

FIG. 2A illustrates an embodiment of a single photon source 200a that includes an excitation region 218a formed in an excitation cavity 212a. The single photon source 200a also includes a photon emission resonant cavity 250a and a transport device (e.g., electrodes 232a) for physically moving a quantum system between the excitation region 218a and the photon emission region 250a.

As discussed herein, in some embodiments the quantum system is, for example, an ion or a bound surface state electron. In some embodiments, such a quantum system is spatially localized within the excitation region 218a using a potential well created by a voltage applied to an electrode located in the excitation region 218a, as illustrated in FIG. 2A. In some embodiments, the quantum system is spatially localized within the excitation region 218a using a quadrupole ion trap. In general, such quadrupole ion traps may include a series of electrodes that can trap an ion in a particular region using DC and radiofrequency electric fields. Other ways of spatially localizing a quantum system within the excitation region 218a can also be used.

In some embodiments, the excitation region 218a is formed in an excitation cavity. The excitation cavity 212a can be a waveguide that can be used to couple excitation radiation 214a from an optical source to the excitation region 218a. For example, the excitation cavity 212a can be a linear section of a waveguide. The waveguide can be any of several different types, including, for example, a ridge waveguide, a strip-loaded waveguide, an optical fiber, etc. The waveguide can be formed from materials that are substantially transmissive to the excitation radiation 214a. In addition, the excitation cavity waveguide 212a can be formed on a substrate and surrounded by appropriate cladding materials. The waveguide 212a can also be designed to promote certain modes and/or polarizations of light that will effectively excite a quantum system located in the excitation region 218a. For example, the excitation radiation 214a can be provided with a polarization that is parallel or normal to the surface of the excitation region 218a, depending upon, for example, the dipole moment of the excited quantum system.

The excitation region 218a can be formed in a slot formed in the excitation cavity 212a. The slot can be designed so as to provide a large optical field for exciting a quantum system located at the excitation region 218a. Other structures that create a sufficiently-strong optical field in the excitation region 218a can also be used in place of the slot. The excitation region 218a need not necessarily, however, be formed within a waveguide 212a in order to couple excitation radiation 214a to the excitation region 218a. For example, one or more lasers could be pointed and focused at the excitation region 218a (e.g., in a quadrupole ion trap), and excitation radiation 214a from the laser(s) could be coupled to the excitation region 218a by free space or unguided propagation using various optical elements (e.g., lenses, minors, beam-splitters, etc). Many other structures and methods can also be used for coupling excitation radiation 214a to the excitation region 218a. Moreover, in some embodiments, a quantum system located at the excitation region 218a can be excited using some other type of excitation energy (e.g., electrical).

In some embodiments, the quantum system is excited to a predetermined energy level using a Stimulated Raman Adiabatic Passage (STIRAP) technique, as described herein. This technique is advantageous in that it can robustly raise the quantum system to the predetermined energy level with very high certainty and with relatively good immunity to small variations in the wavelengths, pulse lengths, and/or power levels of the excitation radiation 214a. The STIRAP technique can be used both in cases where the excitation region 218a is located in a cavity (e.g., 212a) or not (e.g., a quadrupole ion trap). In addition, the STIRAP technique can be used in cases where the excitation radiation 214a is guided to the excitation region 218a (e.g., using a waveguide) or not (e.g., laser(s) pointed and focused at the excitation region 218a).

Once the quantum system has been raised to the desired excited energy level by, for example, the excitation radiation 214a, a transport device (e.g., including electrodes 232a) can be used to physically move the quantum system to the photon emission cavity 250a. In some embodiments, the transport device is a bucket brigade-type device, such as a charge-coupled device (CCD). For example, the transport device may include an array of electrodes 232a (e.g., a line array) to which voltages are applied from a controllable voltage source. The voltages applied to the electrodes 232a in the transport device can be used to create potential wells that can be used to hold the quantum system in a desired spatial position. The potential wells can be shifted toward the photon emission cavity 250a by shifting the voltages that are applied to the respective electrodes 232a. This can be done, for example, in time with a clock signal from a clock device. In this way, the quantum system can be shifted from the excitation region 218a to a photon emission region 252a within, for example, the photon emission resonant cavity 250a. In some embodiments, however, a quadrupole ion trap can serve as the transport device. Other types of transport devices are also possible.

The embodiment illustrated in FIG. 2A can be particularly advantageous in the case of a quantum system whose excited state has a spontaneous lifetime that is greater (e.g., 10× greater, 100× greater, or 1000× greater) than the transit time from the excitation region 218a to the photon emission region 252a. In such cases, the quantum system can be effectively excited and moved to the designated photon emission region 252a before the excited quantum system spontaneously transitions to a lower energy level.

The photon emission region 252a can be formed in a resonant cavity 250a. The photon emission resonant cavity 250a can be designed to induce the quantum system to drop from the excited energy level (e.g., n=2) to, for example, its ground state energy level (n=1). This de-excitation results in the release of a photon 204a. The energy and wavelength of the photon 204a are dependent upon the energy gap between the excited energy level of the quantum system and the lower energy level to which it transitions.

As illustrated in FIG. 2A, the photon emission resonant cavity 250a can be a micro-ring resonator. The micro-ring resonator can be circular or oval in shape. It can also take other ring shapes that provide a closed optical path. Other types of optical cavities can also be used, in some embodiments, in place of any of the micro-ring cavities disclosed herein. For example, micro-disc cavities can be used in some embodiments, as can photonic crystals. The photon emission resonant cavity 250a has one or more frequencies at which it resonates.

The photon emission resonant cavity 250a can be formed using any of several types of waveguides including, for example, ridge waveguides, strip-loaded waveguides, optical fibers, etc. In addition, the photon emission resonant cavity 250a can be formed on a substrate and surrounded by appropriate cladding materials. In some embodiments, the photon emission resonant cavity is formed of a material that is substantially transmissive to the photon 204a emitted by the excited quantum system upon de-excitation at the photon emission region 252a. Any of the micro-ring resonators described herein can be, for example, of the sort used in the following references, which are incorporated by reference herein in their entirety: 1) Little, et al., "Microring resonator channel dropping filters," IEEE J. of Lightwave Tech., Vol. 15, 1997, pp. 998-1005; 2) Agarwal et al., "Fully Programmable Ring-Resonator-Based Integrated Photonic Circuit for Phase Coherent Applications," IEEE J. of Lightwave Tech., Vol. 24, No. 1, January 2006, pp. 77-87.

The dimensions and shape of the photon emission resonant cavity 250a will, in part, determine the resonances of the cavity. Light traveling within the photon emission resonant cavity 250a can interfere constructively or destructively with itself depending upon, for example, the length of the closed path through the resonant cavity, the wavelength of the light, and the effective index of refraction along that path. In the case of, for example, an unbroken ring, light for which the total optical path length around the ring is an even number of half-wavelengths will experience constructive interference; light for which the total optical path length is an odd number of half-wavelengths will experience destructive interference. In the case of rings that include notches, slots, and/or other structures, the resonance condition can become more complicated. For example, a slotted ring can be viewed as including two resonant structures: a partial ring and a Fabry Perot resonator at the slot. The properties of such resonant structure(s) can be engineered, based on these and other factors, so that the photon emission resonant cavity 250a includes a resonance at the wavelength of the photon 204a emitted by the quantum system upon de-excitation. In some embodiments, the Q-factor of this resonance is greater than $10^4$, or greater than $10^5$, or greater than $10^6$.

The excited quantum system can be induced by the photon emission resonant cavity 250a to transition to a lower energy level using, for example, the Purcell Effect. If the resonant cavity exhibits resonance at the wavelength of the photon 204a emitted when the quantum system transitions to a lower energy level, then the transition rate for the quantum system can be substantially enhanced. This effect can also be dependent upon other factors, such as the volume of the photon emission resonant cavity 250a and its Q-factor. In some embodiments, the transition time for the quantum system can be substantially reduced, down to, for example, the level of nanoseconds or sub-nanoseconds—a relatively small fraction of the ordinary spontaneous lifetime of the quantum system while in the excited state. Accordingly, an emission process which might take, for example, hundreds of nanoseconds under ordinary circumstances can be substantially sped up using an appropriately-tuned photon emission resonant cavity 250a.

This induced de-excitation of the excited quantum system is advantageous because it can reduce statistical uncertainty in the precise timing of the emission of the photon 204a. For example, rather than being forced to wait a length of time on the order of the normal spontaneous lifetime of the excited state in order to be reasonably certain that a photon will have been emitted, the single photon source 200a can instead be configured to only wait a length of time on the order of some fraction of the normal spontaneous lifetime before being reasonable certain that the photon 204a will have been emitted. Accordingly, the operation (e.g., clock rate) of the single photon source 200a can be sped up so that single photons can be outputted at higher rates. The operation of the single photon source can be pulsed, for example, with pulses being synchronized with bucket brigade movement and mission or extraction of the photon 204a.

After the photon 204a is emitted in the photon emission resonant cavity 250a, it can be coupled outside of the resonant cavity 250a to, for example, an output port 270a. FIG. 2A does not illustrate a specific structure or mechanism for coupling the photon out of the photon emission resonant cavity 250a. Various structures and mechanisms can be used for coupling the photon 204a out of the photon emission resonant cavity 250a, examples of which are discussed herein.

In some embodiments, the single photon source 200a uses, for example, physically separated excitation and emission cavities made on a common optically integrated planar lightwave circuit (PLC). This can be referred to as a Quantum Light-wave Circuit (QLC). This physical separation allows, inter alia, opportunities for suppression of background noise using spatial and wavelength filtering at different points (e.g., between the excitation and emission cavities, before the excitation cavity, after the emission cavity, etc.) to achieve noise levels well below the dark count rate of existing single photon detectors used in quantum information applications. In some embodiments, a wavelength filter (e.g., a band pass filter with a narrow, high transmission peak and high rejection elsewhere) can be placed along the path of the photon 204a after the photon emission resonant cavity 250a to reject unwanted optical noise having, for example, wavelengths other than that of the photon 204a. Spatial filters can be arranged in locations to isolate sources of optical noise from reaching, for example, the photon emission region 252a, the photon emission resonant cavity 250a, and/or the output port. Integration of filters in the emission cavity in the same PLC can help to improve the single photon emission probability of the single photon source 200a.

In some embodiments, after the single photon has been extracted from the single photon source 200a, it remains within the PLC where other quantum processing elements are situated. The proposed integrated QLC architecture with PLC compatibility is advantageous in some embodiments because it leverages significant recent developments in PLC technology. These advantages include that the single photon can benefit from very low insertion losses (e.g., <0.1 dB) through various routing and processing elements, which may allow for creating scalable photonic integrated quantum information circuits for quantum information applications.

Figure 2B:
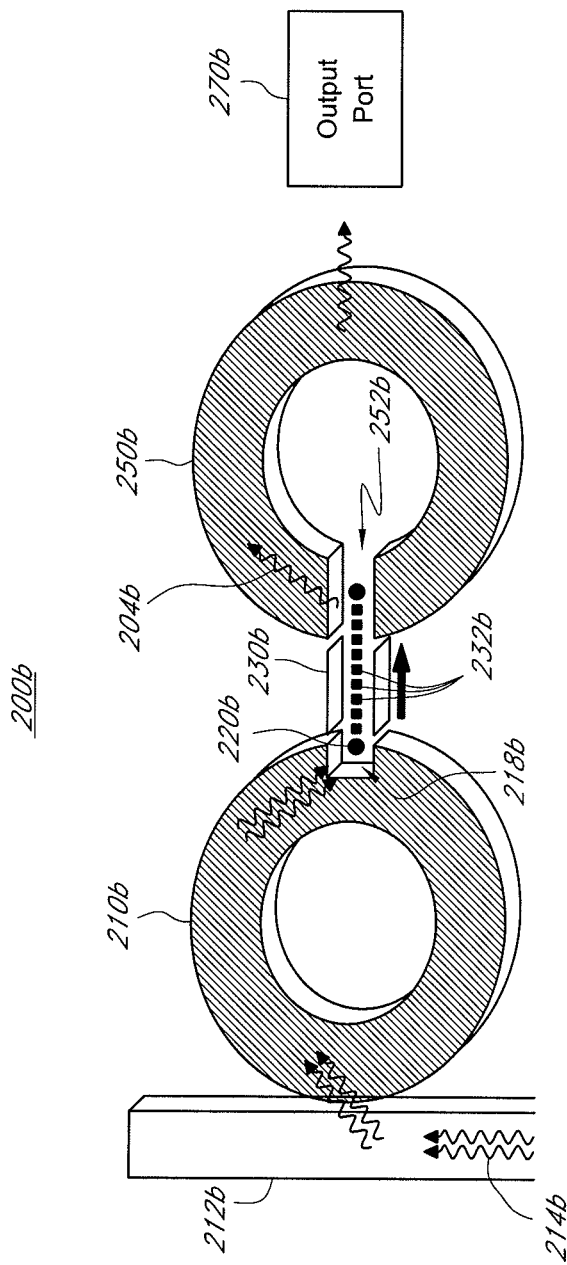
FIG. 2B illustrates an embodiment of a single photon source.

FIG. 2B illustrates an embodiment of a single photon source 200b that includes an excitation resonant cavity 210b and a photon emission resonant cavity 250b. The single photon source 200b also includes an input waveguide 212b for coupling excitation radiation into the excitation resonant cavity 210b. The excitation radiation 214b is used to excite a quantum system to an excited energy level, as described herein. The single photon source 200b also includes a transport device 230b for moving the quantum system from the excitation resonant cavity 210b to the photon emission resonant cavity 250b. FIG. 2B does not illustrate a specific structure or mechanism for coupling the photon 204b out of the photon emission resonant cavity 250b to the output port 270b. Various structures and mechanisms can be used for coupling the photon 204b out of the photon emission resonant cavity 250b, examples of which are discussed herein.

As illustrated in FIG. 2B, the excitation resonant cavity 210b can be a micro-ring resonator. The micro-ring resonator can be circular or oval in shape. It can also take other ring shapes that provide a closed optical path. Other types of resonant cavities can also be used in some embodiments, as can photonic crystals. The excitation resonant cavity 210b has one or more frequencies at which it resonates. As discussed herein, such micro-ring resonators can be formed of various materials. The dimensions of the micro-ring resonator, and its materials, can be used to design the resonator to exhibit resonance at selected frequencies.

The excitation radiation 214b propagates through the input waveguide 212b from a light source. When the wavelength(s) of the excitation radiation 214b lies in a resonant band of the excitation resonant cavity 210b, then the excitation radiation 214b is coupled from the input waveguide 212b into the excitation resonant cavity 210b where it travels around the closed optical path of the ring. The excitation resonant cavity 210b can be designed to include resonances at the wavelength(s) of the excitation radiation 214b such that the excitation radiation is coupled from the input waveguide 212b to the excitation resonant cavity 210b (specifically to the excitation region 218b of the cavity) where a quantum system is located.

The quantum system can be spatially localized at the excitation region 218b within the excitation resonant cavity 210b. The excitation region 218b can be, for example, a notch or a slot formed in the excitation resonant cavity 210b, though other structures that create sufficiently-strong optical fields in the excitation region 218b can also be used. The quantum system can be spatially localized within the excitation region 218b using, for example, one or more electrical potential wells, as described herein.

As discussed herein, in some embodiments, the quantum system is excited to a predetermined energy level using a Stimulated Raman Adiabatic Passage (STIRAP) technique, which is advantageous in that it can robustly raise the quantum system to the predetermined energy level with very high certainty.

In some embodiments, the excitation resonant cavity 210b is designed so as to discourage the excited quantum system from spontaneously transitioning back to a lower energy level (e.g., the ground state energy level). This can be done, for example, by designing the excitation resonant cavity 210b to substantially avoid resonance at the wavelength of the photon that would be emitted if the excited quantum system were to undergo a downward energy transition from its excited energy level. In other words, the excitation resonant cavity 210b can be designed so that it has a photonic band gap at the wavelength of the photon such that the photon cannot exist in the resonant cavity 210b because its wave function would substantially self-cancel. Since the photon cannot exist in the photonic band gap of the resonant cavity 210b, assuming the cavity is designed appropriately, the excited quantum system does not spontaneously emit the photon 204b while it is located in the excitation resonant cavity 210b. Accordingly, in some embodiments, the quantum system can be excited to a desired energy level, and held while it occupies that energy level (e.g., for an amount of time longer than the normal spontaneous lifetime of the excited state) until a photon is demanded from the single photon source 200b.

Once the quantum system has been raised to the desired excited energy level by the excitation radiation 214b, the transport device 230b can be used to physically move the quantum system to the photon emission cavity 250b. As discussed herein, in some embodiments, the transport device 230b is a bucket brigade-type device with an array of electrodes 232b to which voltages are applied from a controllable voltage source to create a moving potential well.

The photon emission resonant cavity 250b can be designed to induce the quantum system to drop from the excited energy level (e.g., n=2) to, for example, its ground state energy level (n=1). This de-excitation results in the release of a photon 204b. As discussed herein, the excited quantum system can be induced by the photon emission resonant cavity 250b to transition to a lower energy level using, for example, the Purcell Effect.

Similarly to the excitation resonant cavity 210b, the photon emission resonant cavity 250b can be a micro ring resonator, a photonic crystal, or the like. Unlike the excitation resonant cavity 210b, however, the photon emission cavity may be intentionally designed to exhibit resonance at the wavelength of the photon 204b emitted when the excited quantum system transitions from the excited energy level to the lower energy level. Thus, the photon emission resonant cavity 250b may, for example, have a different diameter than the excitation resonant cavity 210b and/or be made of a material that has a different refractive index. In some embodiments, the single photon source 200b uses, for example, physically separated excitation and emission cavities made on a common optically integrated planar light-wave circuit (PLC).

Figure 3A:
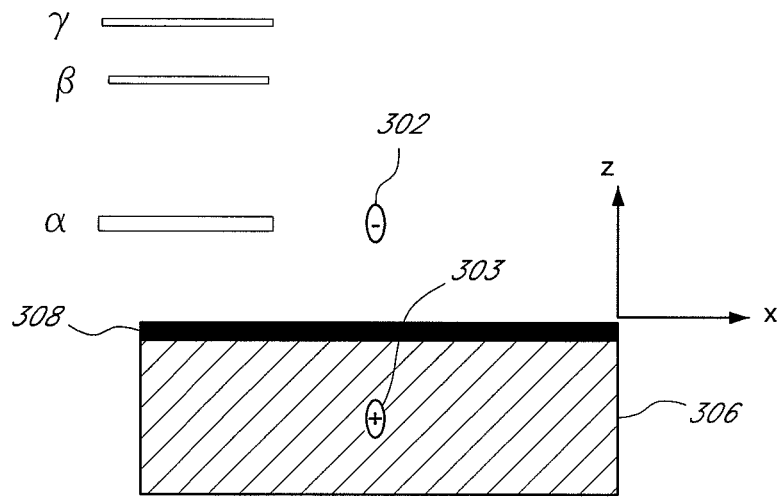
FIG. 3A illustrates an electron in a bound surface state.

FIG. 3A illustrates an electron 302 in a bound surface state. In some embodiments, the quantum system (e.g., 102) is such a bound surface state electron. The electron 302 is bound to, for example, a dielectric, semiconducting, or metallic substrate 306. Image potential electronic surface states can occur at the transition from solid or liquid matter to a vacuum or rarefied phase of matter subject to the existence of an effective potential barrier at the transition.

The bound surface state electron 302 can be conceptually understood as being electrically attracted to a positive image charge 303 located in the substrate 306. The electron 302 sees an attractive "image potential" V(z) that varies with height z above the surface of the substrate 306 according to the following equation:

$$V(z) = -Qe^2/z, \text{ with } Q = (\in -1)/4(\in +1)$$

where $\in$ is the electrical permittivity of the surface matter and e is the electron charge.

Figure 3B:
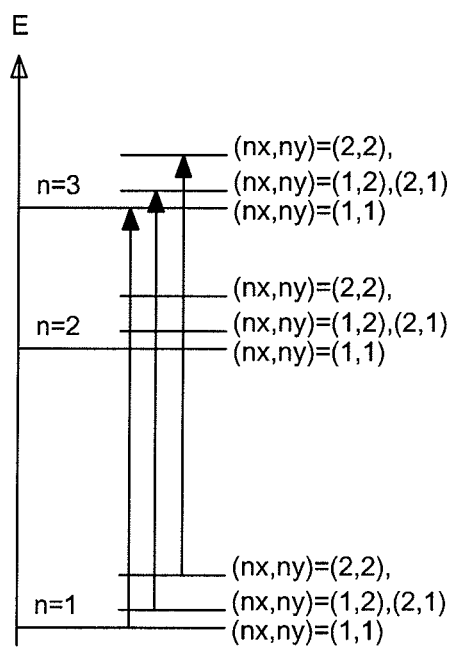
FIG. 3B illustrates energy levels of a bound surface state electron with some lateral freedom of motion.

If the electron 302 encounters a potential barrier at the surface of the substrate 306 (e.g., on the order of, for example, an electron volt), it forms a substantially one-dimensional bound surface state with a spectrum of energy levels analogous to those of single electron hydrogen atoms. These energy levels are illustrated in FIG. 3A for n=1, 2, and 3, for example. As illustrated, the distance between the bound surface state electron 302 and the surface of the substrate 306 is dependent upon the energy level of the electron. (Due to the lateral degree of freedom of the electron, there are additional energy levels associated with every level in FIG. 3A, as shown in FIG. 3B. We can label these additional levels by two more quantum indices, $n_x$ and $n_y$. In some embodiments, the electron is confined laterally by an electrode, as described herein. In some embodiments, the lateral confinement is of the order of a micron by a micron, hence the energy spacing of these additional energy levels are of the order of $10^{-7}$ eV, much smaller than the typical thermal energy and the energy spacing depicted in FIG. 3A. The initial "ground state" of the system may be a statistical mixture of many levels with n=1 but variety of $n_x$ and $n_y$. However, in some embodiments, transitions caused by an electric field perpendicular to the surface occur only between levels with the same initial and final indices of $n_x$ and $n_y$ (see FIG. 3B). Hence, the levels depicted in FIG. 3A, are the effective energy levels for this system and each initial level executes its own STIRAP process without cross interference.)

The substrate 306 can be advantageously made of a material that exhibits negative electron affinity (NEA). Alternatively, the substrate 306 can be advantageously coated with a layer 308 of NEA material. The negative electron affinity prevents the bound surface state electron 302 from penetrating the surface of the material.

Surface states were first observed on the surface of liquid helium at temperatures near absolute zero. It was discovered that liquid helium exhibits negative electron affinity, as it takes energy to push an electron into liquid helium; this potential barrier helps create a stable set of quantized energy levels just above the surface of liquid helium. A similar property is observed for solid or liquid rare gases, like argon, xenon, and krypton. Thus, in some embodiments, the substrate 306 and/or the NEA layer 308 is a solid or liquid rare gas.

In addition, bound surface states are now known to constitute a general feature of the electronic states of other materials that exhibit negative electron affinity. These include certain semiconductors, such as gallium arsenide and gallium nitride, which can usefully exhibit negative electron affinity at room temperatures. The conductivity/higher dielectric constants of semiconducting NEA surfaces makes them capable of supporting bound surface electron states with energy level spacings in the mid- and near-infrared portion of the electromagnetic spectrum, which is advantageous for some quantum information applications. Any of the foregoing materials, or other negative electron affinity materials, for example, can be used as the substrate 306 and/or the NEA layer 308 in various embodiments.

The surface state electron 302 can be spatially localized in a predetermined position at the excitation region (e.g., 218) by using an electrode to create a potential well and/or by appropriately designing the shape of the surface of the material to which the surface state electron is bound. For example, the surface state electron can be spatially localized in the lateral directions parallel to the surface tangent by connecting an appropriate positive voltage to one or more appropriately-shaped and sized electrodes to create a positive electric potential well. The positive electric potential well can help prevent a bound surface state electron from migrating freely over the NEA surface.

In some embodiments, the NEA substrate 306 and/or layer 380 is formed in the excitation region 218a, 218b illustrated in FIGS. 2A, 2B. The NEA substrate 306 and/or layer 380 can also be formed in the transport device 230. The electrode for spatially localizing the bound surface state electron can be formed, for example, in, on, under, or as part of the NEA material in the excitation region 218. Thus, the potential well created by such an electrode can be used to spatially localize the bound surface state electron 402 within the excitation region 218 of the single photon source 200.

Figure 4:
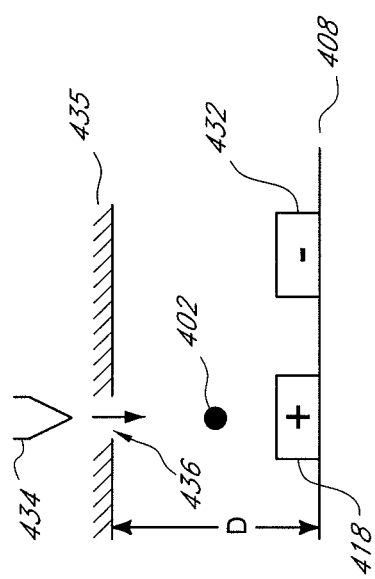
FIG. 4 illustrates an electron source for providing a bound surface state electron that is spatially localized within a potential well created by an electrode.

FIG. 4 illustrates an electron source 434, 435 for providing a bound surface state electron 402 that is spatially localized within a potential well created by an electrode 418. The potential well is created by an electrode 418 that is connected to a positive voltage source. The electrode 418 is formed, for example, on, in, under, or as part of an NEA surface 408. In some embodiments, the electrode 418 itself is made of an NEA material. The electrode 418 can be a generally flat pad, as illustrated in FIG. 4. It can also take a variety of other shapes, however. In addition, multiple electrodes can be used to create the potential well for spatially localizing the bound surface state electron 402. FIG. 4 also illustrates a second electrode 432 that is connected to a negative voltage source. This electrode 432 represents, for example, part of the transport device 230 illustrated in FIG. 2. The bound surface state electron 402 can be shifted to the right by, for example, switching the voltages applied to the electrodes 418, 432, respectively. The transport device is described more fully herein.

The electron source 434, 435 can be positioned, for example, above and pointed at the electrode 418 so as to emit electrons towards the potential well created by the electrode. In some embodiments, the electron source is an electron gun that includes a field emission point 434 and an extraction electrode 435. A voltage is applied to the extraction electrode to accelerate electrons emitted from the field emission point 434 through an aperture 436. The voltage applied to the extraction electrode 435 can be varied to control the rate at which the potential well created by the electrode 418 is filled. The electron source 434, 435 is separated from the NEA surface by a distance D. In some embodiments, the distance D is approximately 1000 µm or less, or approximately 100 µm or less, though other distances can also be used.

By considering the Fermi levels of the field emission point 434 and of the surface states (n=1, 2, 3 . . . ), respectively, electrons can be injected into the potential well created by the electrode 418 with the correct energy to enter, for example, the ground energy level (n=1) of the surface state. For example, the Fermi level of the field emission point 434 can be aligned with the energy of the ground state to be populated.

In some embodiments, it is advantageous to have the ability to inject one and only one electron 402 into the bound surface state illustrated in FIG. 4. This can be done by, for example, adjusting the potential well created by the electrode 418 so that it is only "deep" enough to trap a single electron. The "depth" of the potential well can be adjusted by varying the voltage applied to the electrode 418, by varying the size and shape of the electrode, and/or by adjusting other factors. For example, if multiple electrons from the electron emitter 434, 435 become bound to the NEA surface 408 above the electrode 418 in surface potential states, they will experience a coulomb repulsive force from one another. Depending upon, for example, the size of the electrode 418 and the depth of the potential well, this coulomb repulsive force may be strong enough to eject one or more of the electrons. Thus, the size of the electrode pad, and/or its bias voltage, can be adjusted to appropriate values such that the potential well created by the electrode 418 is configured to stably trap only a single electron. With such a configuration, as soon as a second electron enters the potential well, one of the two electrons will be ejected by coulomb repulsion. It may be somewhat difficult, however, to reliably and deterministically inject precisely one electron 402 into such a single-electron potential well.

In some embodiments, the probability of filling the potential well created by the electrode 418 with a single electron can be increased by injecting multiple electrons into the potential well and then controllably ejecting excess electrons until a single electron remains. For example, the potential well created by the electrode 418 can be initially configured so as to be capable of supporting multiple surface state electrons rather than a single electron. For example, the voltage applied to the electrode 418 can be initially set to a first level that results in a potential well deep enough to hold multiple electrons (e.g., on the order of 10 electrons, though this number can vary). As discussed herein, the field emission point 434 can be used to inject multiple electrons at the energy level to be populated (e.g., the ground state energy level) by aligning the Fermi level of the field emission tip with that energy level. The potential well created by the electrode 418 can be maintained in this multiple-electron state while the potential well is being filled by the electron source 434.

Since the potential well created by the electrode 418 is initially capable of supporting multiple electrons, there is a relatively high probability that the potential well will be populated with at least one electron within a given period of time. After this initial filling phase, the voltage applied to the electrode 418 can be changed (e.g., reduced) to a second level that results in a potential well capable of supporting only a single surface state electron. In some embodiments, the number of electrons trapped within the potential well can be reduced by adiabatically reducing the depth of the potential well. For example, as the voltage applied to the electrode 418 is reduced, excess electrons within the potential well that can no longer be supported will be ejected by coulomb repulsion until a single electron remains. In this way, the potential well can be progressed from a state of relative uncertainty as to the precise number of trapped electrons to a state of relative certainty that a single electron is trapped. This process may represent a robust method of deterministically populating the potential well with a single bound surface state electron.

This effect has been experimentally verified for a liquid helium NEA surface. The repulsive coulomb potential acting between multiple surface state electrons bound to the helium surface and captured in a potential well created by an electrode can be exploited to control the number of electrons that are stably bound within the potential well. Under certain circumstances, if the coulomb potential is larger than the electrons' binding energy, the injected electrons will be ejected from the potential well until the electrons' coulomb energy is reduced to a level below their binding energy, forming a "Wigner Island" with characteristic structure and number density. By varying the depth of the potential well which constrains the lateral motion of the electrons injected onto the liquid helium surface covering the underlying electrode, the number of trapped surface electrons in such a Wigner Island can be reproducibly and selectively controlled from, for example, N=1 to N=100.

In some embodiments, the electron emitter 434, 435 includes some device, and/or uses some method, for controlling the tunneling rate between the field emission point 434 and the surface states so that an electron 402 that has filled the potential well created by the electrode 418 does not migrate back to the field emission point 434. For example, in some embodiments, an electrical gate can be created by introducing an appropriate potential hill between the field emission point 434 and the substrate, thus reducing the tunneling rate. Such an electrical gate can be opened to allow electrons to migrate towards the electrode 418, and then shut, for example, after some period of time so as to prevent electrons from migrating back toward the field emission point 434. Other types of gating devices can also be used.

Alternatively, and/or in addition, the potential well created by the electrode 418 can be flooded with electrons, for example, for a specified period of time. Then, the voltages applied to the electrodes 418, 432, respectively, can be controlled so as to physically move the bound surface state electron 402 away from the field emission point 434 so that the electron does not migrate back to the field emission point. While the bound surface state electron 402 can be moved away from the field emission point, it can still be maintained within the excitation region 218 so that the electron can be excited using the excitation radiation 214.

Figure 5:
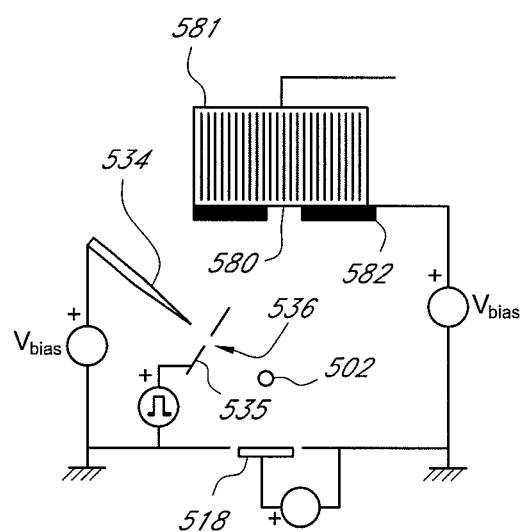
FIG. 5 illustrates an electron source and a tuning electrode for providing a bound surface state electron that is spatially localized within a potential well.

FIG. 5 illustrates an electron source 534, 535 and a tuning electrode 582 for providing a bound surface state electron 502 that is spatially localized within a potential well. The electron source 534, 535 can be used in a similar manner as described with respect to the electron source in FIG. 4. In addition, the electrode 518 can be connected to a positive voltage for creating a potential well to spatially localize the bound surface state electron 502, as described herein. FIG. 5 also illustrates, however, a tuning electrode 580 positioned above the potential well created by the electrode 518. A voltage can be applied to the tuning electrode 580 to create a potential gradient between the tuning electrode 580 and the NEA surface where the electrode 518 is formed. This potential gradient can be useful for altering the binding energy of the surface state electron 502 via the first-order Stark shift. Positive or negative potential gradients can be introduced to control the surface state electron 502. Other structures and methods can also be used for creating a similar potential gradient.

As discussed herein, the repulsive coulomb potential acting between multiple bound surface state electrons that may be injected into the potential well created by the electrode 518 can be exploited to control the number of electrons that are stably bound within the potential well. Attaining the level of coulomb interactions required to achieve this control of surface charge density may be somewhat more difficult with semiconductor NEA surfaces than for condensed rare gases since the bound electrons are localized at smaller mean distances from the surface with smaller effective dipole moments. The potential gradient created by the tuning electrode 580 in FIG. 5 can be advantageously used in such embodiments to increase the dipole moments of bound surface state electrons and their coulomb interactions. This can improve the control of the number of trapped surface state electrons so that a single bound surface state electron 502 can be reproducibly and selectively trapped in the potential well created by the electrode 518. The tuning electrode 580 is not, however, necessarily required in embodiments that use semiconductor NEA surfaces to create the electron surface states.

In some embodiments, the tuning electrode 580 can be the front surface of a multichannel plate (MCP) electron multiplier. Given an appropriate settling time interval for the surface electrons emitted from the electron source 534, 535 to reach their equilibrium densities following injection with a specific vertical positive potential gradient, the gradient can then be controlled (e.g., increased) to the point at which the surface electrons are field ionized. Negative potential gradients can be used for ionization, for example, in the case of trapped positive ions. The MCP can be used to determine the number of electrons ionized from surface potential states by measuring the charge at the output plane 581 of the MCP. In some embodiments, the front plane of the MCP can be screened with a mask 582 to block artifact electrons released form, for example, other locations on the NEA surface. The tuning electrode 580 and the multichannel plate electron multiplier can be used to control and monitor the number of electrons trapped in the potential well created by the electrode 518. The MCP electron multiplier may be useful for investigation of the properties of the surface potential states, however it is not required for routine operation of the single photon source.

In addition, the energy levels of bound surface state electrons can also be measured using the setup illustrated in FIG. 5. This can be done by, for example, photoemission using a probe laser beam that can be scanned through the transitions between these energy levels, thereby stimulating emission of photons, the energies of which can be measured by an appropriately-placed photodetector. While such a probe laser may be useful for investigation of the properties of the surface potential states, it is not required for routine operation of the single photon source.

Figure 6:
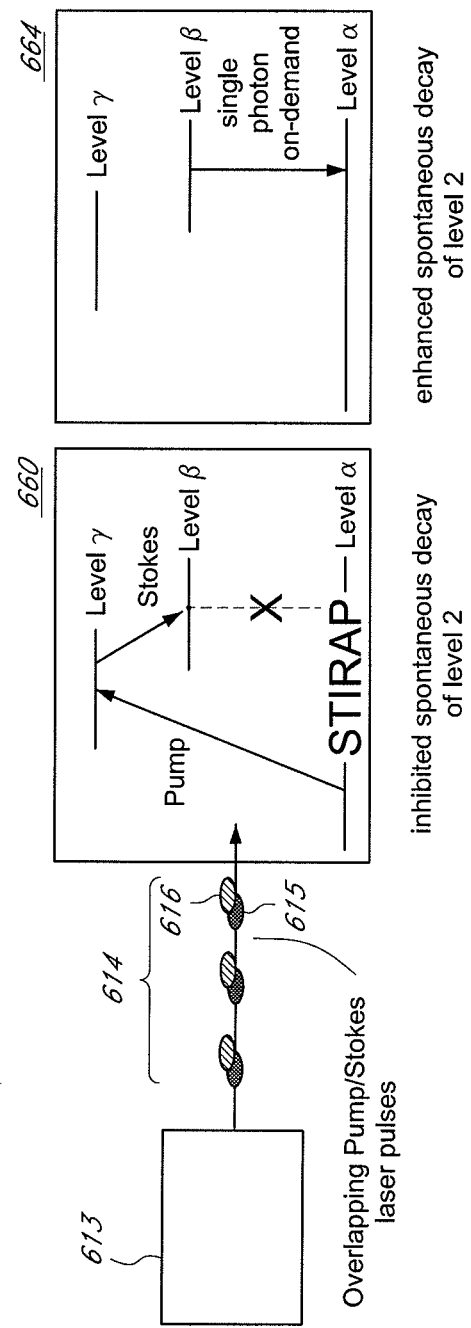
FIG. 6 illustrates excitation and de-excitation phases undergone by a bound surface state electron in some embodiments of a single photon source.

FIG. 6 illustrates excitation 660 and de-excitation 664 phases undergone by a bound surface state electron in some embodiments of a single photon source. Each of these phases is described in more detail herein. However, the excitation 660 and the de-excitation 664 phases are now summarized with respect to FIG. 6. In some embodiments, the excitation phase 660 occurs after a bound surface state electron has been positioned at, for example, the excitation region 218.

As discussed herein, in some embodiments, the bound surface state electron is deposited in the ground energy level surface state, which is illustrated as, for example, Level $\alpha$ in the diagram of the excitation phase 660. The illustrated excitation scheme involves a three-level system consisting of Level $\alpha$ (e.g., n=1 ground state), Level $\beta$ (e.g., n=2 excited state), and Level $\gamma$ (e.g., n=3 excited state), though other excitation schemes can also be used. For example, more or fewer energy levels can be used in the excitation scheme. In addition, Level $\alpha$, Level $\beta$, and Level $\gamma$ need not necessarily represent energy levels n=1, 2, and 3, respectively. They can represent any three energy levels without limitation as to their relative position with respect to one another.

Excitation radiation 614 is coupled to the ground level surface state electron from a light source 613. The light source 613 can be, for example, a laser such as a diode laser or a free electron laser. Various other light sources can also be used. In some embodiments, useful properties of the light source 613 may include that the wavelength of its output is adjustable, that it is capable of generating a pulse with a suitable temporal waveform for use in the STIRAP process, and that its pulsed output is phase coherent, for example, within each pulse.

A STIRAP process can be used to transfer a bound surface state electron, or other quantum system, from a defined first energy level to a defined third energy level with high statistical certainty and low susceptibility to perturbations in, for example, optical power and pulse shape. The STIRAP process can include providing a first pulse at the wavelength corresponding to the energy gap between a second and third level (without limitation on which of these two energy levels is higher), followed by a second pulse corresponding to the energy gap between the first and the second level. The falling phase of the first pulse can overlap with the rising phase of the second pulse. The result is that the quantized system is transferred from the first to the third energy level with high statistical certainty. For example, the probability of excitation to the third energy level can be better than 99% under a wide range of laser powers and pulse shapes. Meanwhile, there may be a small probability of finding the quantum system in the second level at any point in the process. This probability can be less than 0.1%, for example.

The excitation radiation may include pulses 615, 616 of different wavelengths of light (e.g., pump pulses and Stokes pulses). These pulses 615, 616 excite, for example, the ground level surface state electron to Level $\beta$. In some embodiments, the excited surface state electron in Level $\beta$ is inhibited from dropping back down to, for example, the ground state (e.g., Level $\alpha$) by the excitation resonant cavity 210, as discussed herein. An excitation resonant cavity 210 is not, however, required, as indicated by the embodiment illustrated in FIG. 2A.

In some embodiments, the excited surface state electron, or single instance of some other quantum system, in Level $\beta$ is transported to a photon emission region (e.g., 252) where the de-excitation phase 664 takes place. In some embodiments, the de-excitation phase occurs in the photon emission resonant cavity 250, where the excited Level $\beta$ surface state electron is encouraged to spontaneously decay from Level $\beta$ to Level $\alpha$, emitting a photon 204 in the process. As discussed herein, the transition rate can be enhanced by tuning the photon emission resonant cavity 250 to exhibit resonance at the wavelength of the photon 204 that corresponds to the energy gap between Level $\beta$ and Level $\alpha$.

Figure 7A:
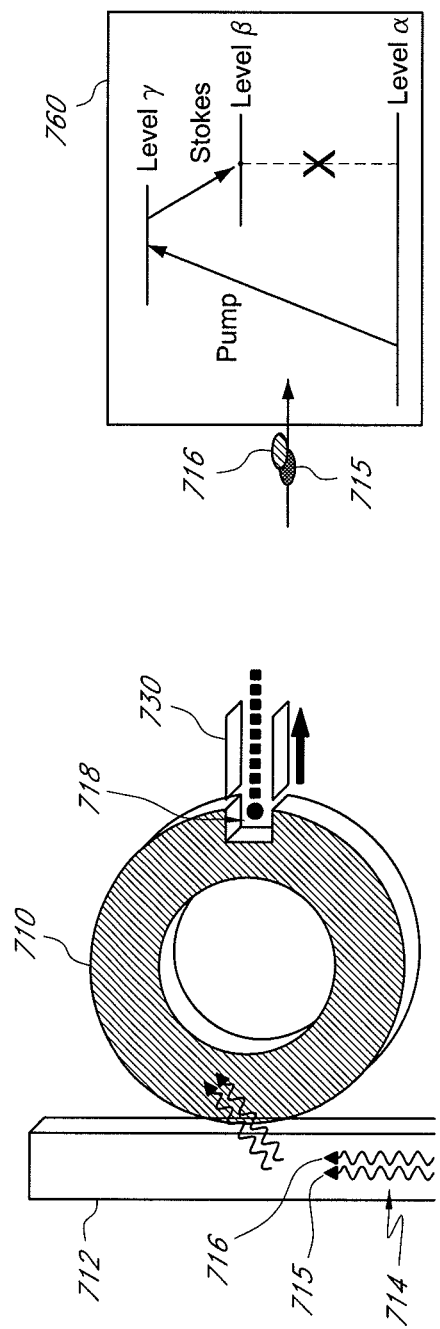
FIG. 7A illustrates an embodiment of an excitation scheme for a single photon source.

FIG. 7A illustrates an embodiment of an excitation scheme for a single photon source. A ground level bound surface state electron can be positioned in the excitation region 718a, as described herein. The excitation radiation 714a can then be coupled to the excitation region 718a. In some embodiments, the bound surface state electron is excited using a Stimulated Raman Adiabatic Passage (STIRAP) technique. The STIRAP technique is advantageous because it can allow for robust, substantially deterministic preparation of the excited state with near-unity probability that the surface state electron will reach the desired energy level.

In some embodiments of the STIRAP technique, two different levels of light energy are used. The mechanism in these embodiments involves two light wavelengths and three levels of the quantized system: the ground state (e.g., n=1) and two excited levels (e.g., n=2 and n=3). Pump energy 715a consists of photons that correspond to the energy gap between Level γ (n=3) and Level α (n=1). Stokes energy 716a consists of photons that correspond to the energy gap between Level γ and Level β (n=2). The precise wavelength of the Stokes energy 716a and the pump energy 715a used in any given embodiment are dependent upon the quantized surface state energy levels.

In embodiments where the Stokes energy 716a and the pump energy 715a are coupled to the excitation region 718a via the excitation resonant cavity 710a, the cavity can be tuned to exhibit resonance at each of the respective wavelengths of the Stokes energy 716a and the pump energy 715a (e.g., while still avoiding resonance that corresponds to the energy gap between Level β and Level a so as to inhibit spontaneous decay of the excited state). The resonant frequencies of the excitation resonant cavity 710a can approximately match the Level α-to-Level γ and the Level γ-to-Level β transitions, and/or the difference between the resonant frequencies of the cavity can approximately match the Level α-to-Level β transition. The resonant frequencies of the excitation resonant cavity 710a can be tuned using appropriate multiples of the free spectral range, together with dispersion and Start shift tuning to enhance the Level α-to-Level γ and Level γ-to-Level β transitions while inhibiting the Level β-to-Level α transition.

As discussed herein, to maintain the quantum system in, for example, Level β, one can suppress the spontaneous decay from Level β back to Level α, for example, by placing the system inside a ring resonator or other resonant cavity which is designed to avoid resonance at the Level β-to-Level α transition. In some embodiments, such a cavity may inhibit the direct excitation from Level α to Level β by a single laser field, such as a π pulse, because the stimulated transition from Level α to Level β could also be suppressed by the resonant cavity. Hence the STIRAP technique, which, in some embodiments, relies on a three-level excitation scheme, serves the dual purpose of providing both the indirect yet robust excitation of the metastable Level β state.

However, as discussed herein, the Level β-to-Level α transition need not necessarily be suppressed in some embodiments of the single photon source, whether in an excitation resonant cavity or in the transport device. For example, this may be the case for quantum systems whose excited energy level has a spontaneous lifetime that is relatively long compared to the time that is necessary to prepare the quantum system for extraction of the photon. While FIG. 7A illustrates the excitation portion of the embodiment of FIG. 2B, the excitation portion of the embodiment of FIG. 2A can also be used. In some embodiments, it is not necessary to inhibit de-excitation of the quantum system with the excitation resonant cavity 710a. For example, it may be that the spontaneous lifetime of the excited state is sufficiently long (e.g., on the order of hundreds of nanoseconds) that there may be time enough to prepare for extraction of the photon before the excited state decays. Therefore, in some embodiments, the excitation region 718a need not necessarily be formed in a resonant cavity.

Figure 7B:
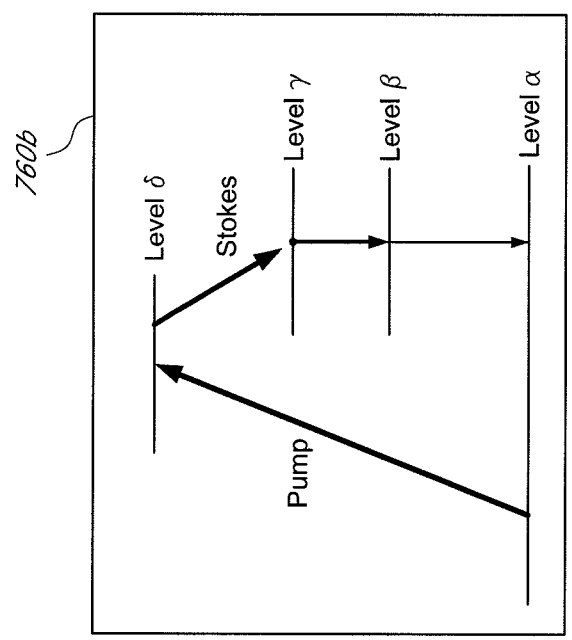
FIG. 7B illustrates an embodiment of an excitation scheme for a photon source that emits a pair of photons.

FIG. 7B illustrates an embodiment of an excitation scheme 760b for a photon source that emits a pair of photons. The illustrated excitation scheme 760b can be used to determine deterministically generate a pair of entangled photons on demand. In the embodiment illustrated in FIG. 7B, the STIRAP technique is applied to a four-level quantized system. The four-level quantized system includes the ground state (e.g., n=1) and three excited levels (e.g., n=2, n=3, and n=4). In this embodiment, pump energy consists of photons that correspond to the energy gap between Level δ (e.g., n=4) and Level α (e.g., n=1), while Stokes energy consists of photons that correspond to the energy gap between Level δ and Level γ (e.g., n=3).

In embodiments where the Stokes energy and the pump energy are coupled to the excitation region 718a via the excitation resonant cavity 710a, the resonant cavity can be tuned to exhibit resonance at each of the respective wavelengths of the Stokes energy 716a and the pump energy 715a, while avoiding resonance that corresponds to the Level β-to-Level α and Level γ-to-Level β energy gaps so as to inhibit spontaneous decay of the excited state. Of course, as discussed herein, no such excitation resonant cavity 710a is required.

Figures 8, 9:
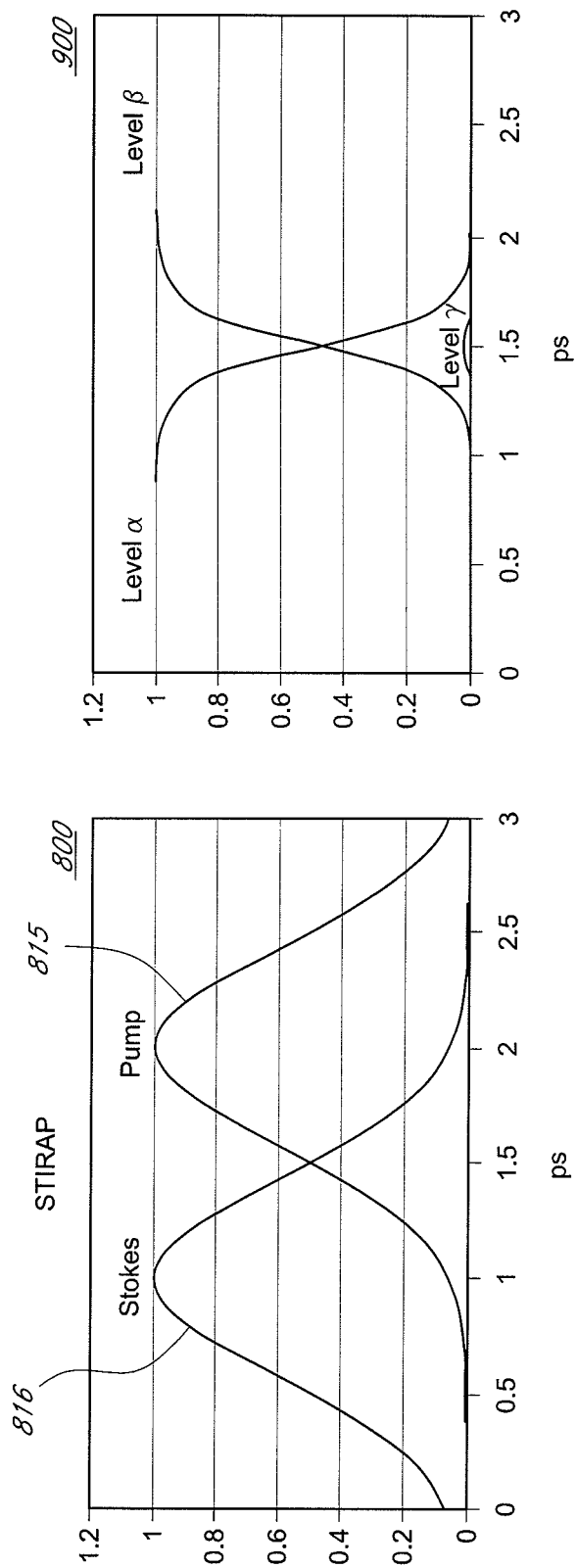
FIG. 8 illustrates two light pulses that can be used to excite a surface electron to a desired elevated energy level using a STIRAP technique.
FIG. 9 is an example plot of the probable energy level of a surface electron during application of the light pulses illustrated in FIG. 8.

FIG. 8 illustrates two light pulses 815, 816 that can be used to excite a surface electron to a desired elevated energy level using a STIRAP technique. In some embodiments, the light pulses 815, 816 are approximately Gaussian in shape, though other shapes can also be used. For example, in some embodiments, the light pulses 815, 816 have other smoothly varying shapes. In addition, in some embodiments the light pulses 815, 816 are phase coherent. As illustrated, the STIRAP technique involves a pulse sequence in which the Stokes pulse (e.g., corresponding to the upper energy gap between Level γ and Level β in the three-level scheme, or between Level δ and Level γ in the four-level scheme) precedes in time, but overlaps, the pump pulse (e.g., corresponding to the lower energy gap between Level α and Level γ in the three-level scheme or between Level α band Level δ in the four-level scheme). The pump pulse 815, which corresponds to the transition between Level α and Level γ, follows and overlaps the Stokes pulse 816 (e.g., the peak of the pump pulse may follow the peak of the Stokes pulse, and the pump pulse 815 may begin as the Stokes pulse is tapering off). The excitation occurs during the STIRAP process as the Stokes pulse 816 is decreasing while the pump pulse 815 is simultaneously increasing.

FIG. 9 is an example plot 900 of the probable energy level of, for example, a surface electron during application of the light pulses illustrated in FIG. 8. As shown, the STIRAP process results in a high probability (asymptotically approaching unity) that the bound surface state electron will end up in Level β after completion of the pump pulse 815. In fact, the electron has a strong probability of directly transitioning from Level α to Level β, and only a relatively small probability of ever entering Level γ. As illustrated in FIG. 9, when the Stokes (upper transition) pulse is turned on, the surface state electron in Level α remains in Level α. Once the pump (lower transition) pulse turns on and begins increasing (while the Stokes pulse is simultaneously decreasing), the surface state electron in Level α adiabatically evolves through a coherent superposition of Level α and Level β during the period of time where the pulses overlap. During the transition from Level α to Level β, it is not probable for Level γ to be populated. Instead, the bound surface state electron is excited to Level β with near certainty and without radiative loss from Level γ.

In some circumstances, the laser intensity used to achieve energy level transfer is inversely proportional to the square of the interaction time. For example, assuming an electric dipole coupling of ~1 Debye, an interaction time of 1 ps would require a single mode laser intensity of ~1011 W/cm$^2$, while an interaction time of 10 ps would only require 109 W/cm$^2$. At least the latter intensity is achievable by many lasers since, in some embodiments, the laser field will be focused to an excitation region of approximately 10 μm×10 μm. One consideration for the power of the excitation laser is the damage threshold of the material(s) (e.g., semiconductor) of which the excitation portion of the single photon source is made. A consideration for pulse duration is the de-excitation lifetime of the excited surface state electron due, for example, to imperfect suppression of spontaneous decay from Level β. In optical sources where micro-pulses can be phase-locked, any number of micro-pulses can be coherently grouped together to achieve the adequate interaction time and power level. This process also takes advantage of the time-dependence of the thermal damage threshold, which generally increases as the square root of the pulse duration.

By illuminating the quantum system with two laser fields (pump and Stokes) in the correct sequence, the system can be excited to, for example, Level β with near unity probability at the end of the pump pulse 815, provided that the laser intensity exceeds a threshold determined by coupling between the quantum system and the laser fields, and phase coherence is maintained throughout the process. The STIRAP technique is very robust because it does not require precise timing nor precise laser power as long as the laser power is above the STIRAP threshold; the transition probability asymptotically converges to unity, rather than exhibiting Rabi oscillations as might be the case in a direct transition to Level β using a single π pulse. The robust reliability of the STIRAP technique in exciting the bound surface state electron to the desired energy level contributes to the substantially deterministic nature of the single photon source.

In some embodiments, other excitation techniques can be used. For example, the bound surface state electron can be directly excited from Level α to Level β using a π pulse. A π pulse is, however, generally more sensitive to perturbations in the power and frequency of the excitation light, as well as to the dipole moment of the quantized electron charge distribution than is the STIRAP technique. For example, the STIRAP technique can tolerate variations in those quantities up to approximately 20%, while still providing reliable and robust excitation of the bound surface state electron to the desired energy level.

Figure 10:
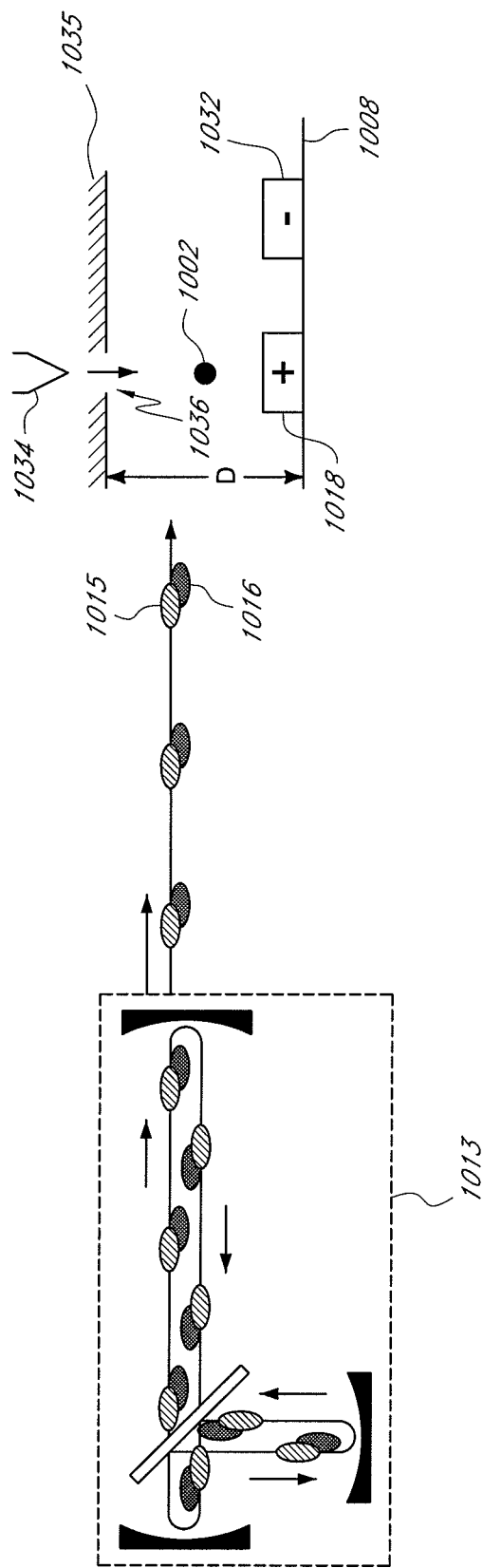
FIG. 10 illustrates an example laser source for exciting the quantum energy level of a bound surface electron provided from an electron source.

FIG. 10 illustrates an example source 1013 for exciting the quantum energy level of a bound surface electron 1002 provided from an electron source 1034, 1035. The source is arranged with respect to the bound surface state electron 1002 so as to couple the excitation energy 1015, 1016 into the excitation region surrounding the electron. The excitation energy 1015, 1016 can be directly coupled to the excitation region, or indirectly coupled. The source 1013 can be any of a variety of optical sources capable of operating at the required wavelengths, pulse powers, pulse shapes, and coherence.

Figure 11:
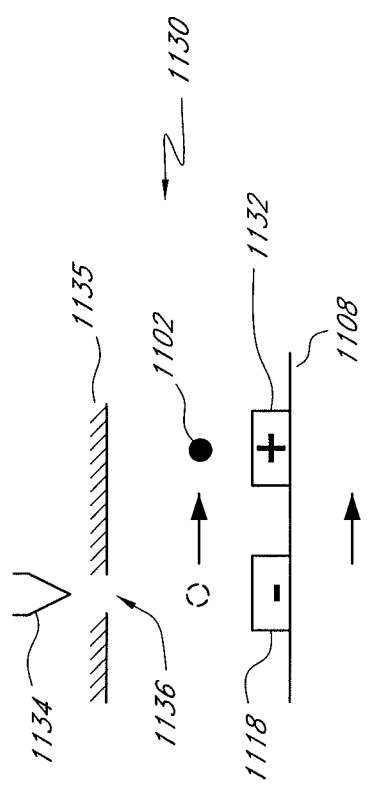
FIG. 11 illustrates an embodiment of an electron transport device for transporting a bound surface state electron from an excitation region to a photon emission region of a single photon source.

FIG. 11 illustrates an embodiment of a portion of an electron transport device 1130 for transporting a bound surface state electron 1102 from an excitation region to a photon emission region of a single photon source. The transport device 1130 is, in some embodiments, a bucket brigade-type shifting device, such as a CCD or a similar device, though other transport devices, such as a quadrupole ion trap, are also possible. In some embodiments, the electron transport device 1130 includes a plurality of electrodes 1118, 1132. The electrodes 1118, 1132 may be formed, for example, on, in, or under an NEA surface 1108. In addition, in some embodiments, the electrodes may themselves be formed of NEA materials. At least one of the electrodes 1118 may be located in a deposition and/or excitation region where a bound surface state electron or other quantum system is deposited using an electron source 1134, 1135 and/or excited, as described herein.

The electrodes 1118, 1132 can be coupled to one or more electric voltage sources in order to create a plurality of potential wells. For example, each electrode 1118, 1132 can be used to create a positive or negative potential well in its vicinity. Alternatively, multiple electrodes can be used to create each positive or negative potential well in the transport device 1130. Since the bound surface state electron has negative charge, it can be spatially localized in, for example, a positive potential well. Thus, in some embodiments, the various electrodes (e.g., 1118, 1132) in the transport device can be used to create a moving positive potential well as a means of controllably transporting the electron to a desired location. Such a moving positive potential well can move the electron 1102 over, for example, an NEA surface while the electron remains in an excited bound surface state.

The bound surface state electron 1102, atom, or ion can be physically transported via the transport device 1130 by shifting the location of the potential well in which it is located. For example, electrode 1132 is shown as being connected to a positive voltage. Thus, a positive potential well is formed in the vicinity of the electrode 1132. As discussed herein, this positive potential well spatially localizes the bound surface state electron 1102 in the vicinity of the electrode 1132. In contrast, a dashed outline of the bound surface state electron 1102 is shown over the electrode 1118, which is connected to a negative voltage, in FIG. 11. The dashed outline of the electron 1102 is intended to show that the electron 1102 was formerly located in a potential well formed by the electrode 1118 at a previous time when the electrode 1118 was connected to a positive electric potential instead of the negative electric potential illustrated in FIG. 11. The potential wells formed by electrodes 1118 and 1132 in FIG. 11 can be compared with those formed by the electrodes to 1018 and 1032 in FIG. 10. Note that the polarity of the electrodes 1118, 1132 in FIG. 11 has been switched as compared to the polarity of the corresponding electrodes 1018, 1032 in FIG. 10, thus causing the bound surface state electron 1102 to shift towards the right with the moving positive potential well.

In some embodiments, the transport device 1130 consists of a linear array of electrodes spanning the distance from, for example, an excitation region (e.g., 218) to a photon emission region (e.g., 252). However, the path of the transport device 1130, or the path of the electron 1102 within the transport device 1130, need not necessarily follow a straight line, as curved paths can also be used.

In some embodiments, the electrodes (e.g., 1118, 1132) are coupled to a controller that controls the timing and switching of the electric voltage applied to each of the electrodes in a coordinated fashion so as to appropriately control the movements and speed of the bound surface state electron 1102 through the transport device 1130. The controller can be used to control the voltages applied to the various electrodes in the transport device so as to create moving patterns of potential wells (e.g., a series of moving alternating positive and negative potential wells, etc.). The controller can include a clock device to cause the voltages to the electrodes to be switched at regular intervals. In some embodiments, the clock rate is at least approximately on the order of 1 GHz.

The transit time of the bound surface state electron 1102 through the transport device 1130 can be controlled, for example, by appropriately sizing the transport device and electrodes (e.g., 1118, 1132), and by controlling the switching rate of the voltages applied to the electrodes. In some embodiments, the transport device 1130 includes approximately on the order of 10 electrodes (e.g., 1118, 1132), while the transit time of the bound surface state electron 1102 from, for example, an excitation region of a single photon source to a photon emission region is less than approximately 10 ns. In embodiments where de-excitation of the excited quantum system is not suppressed, the transit time can be, for example, substantially shorter than the spontaneous lifetime of the excited state so as to avoid premature emission of the photon.

In some embodiments, the effective transit time of an electron 1102 through the transport device 1130 can be decreased by increasing the throughput of the transport device using a pipelining technique. For example, multiple bound surface state electrons can exist in the transport device 1130 simultaneously if the controller creates, for example, multiple discrete positive potential wells (e.g., each surrounded by negative potential wells). Each positive potential well can hold an electron. In this way, a new electron can be shifted into, and/or out of, the transport device 1130 on, for example, each clock cycle of the controller.

Figure 12:
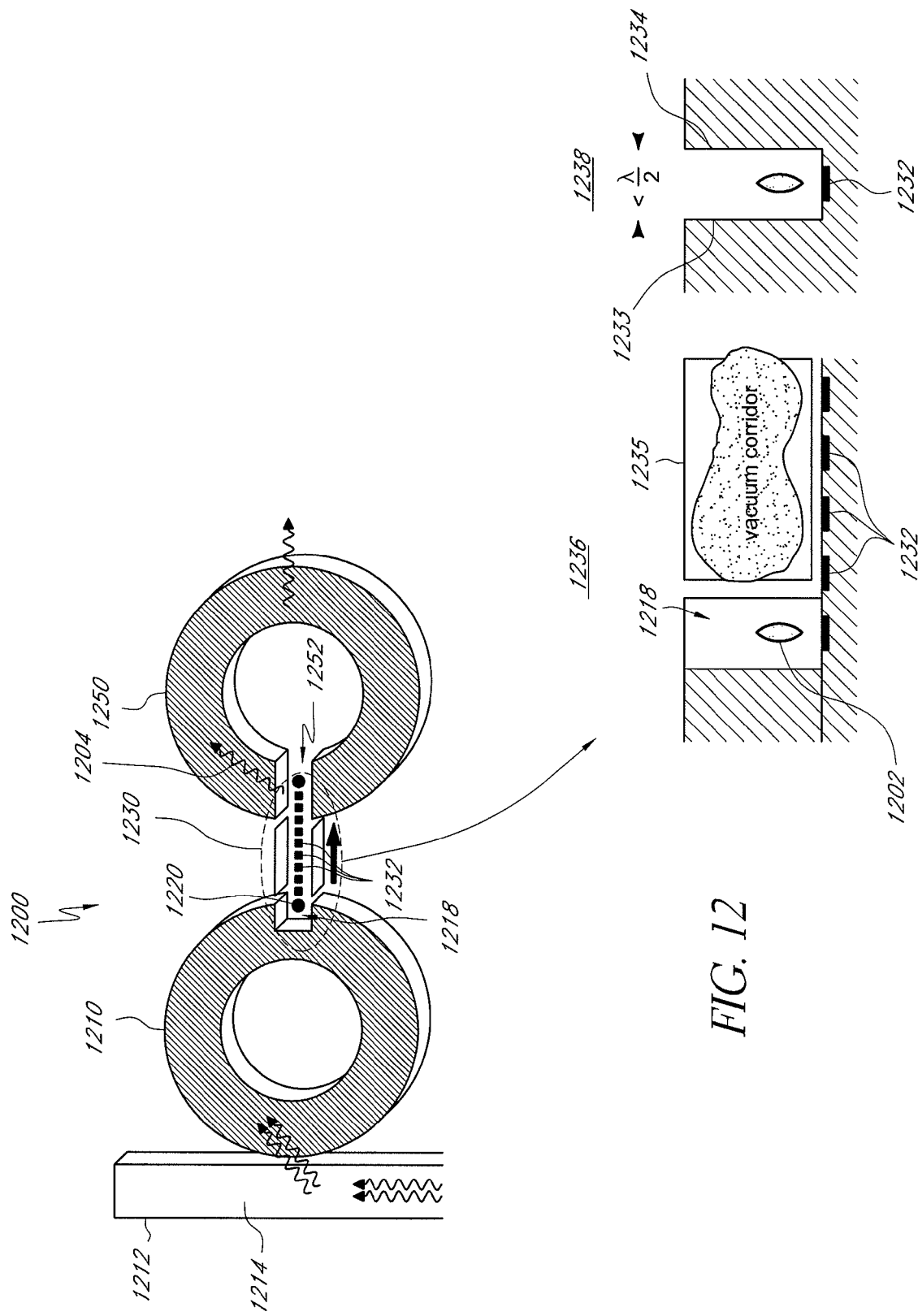
FIG. 12 illustrates an embodiment of the structure of the electron transport device illustrated in FIG. 11.

FIG. 12 illustrates an embodiment of the structure of the electron transport device illustrated in FIG. 11. The dashed oval in FIG. 12 illustrates the contextual position of the transport device 1230 in some embodiments of a single photon source 1200. FIG. 12 also shows magnified cross-sectional views 1236, 1238 of the transport device. As described further with respect to FIG. 12, the transport device 1230 can be designed so as to inhibit de-excitation of the excited electron 1202 while in transit, for example, between the excitation region 1218 and the photon emission region 1252. It should be understood, however, that in some embodiments the transport device 1230 is not designed so as to suppress de-excitation of the excited electron 1202 while in transit. This may be the case, for example, where the spontaneous lifetime of the excited electron 1202 is sufficiently long to transport the electron to the designated photon emission region before spontaneous de-excitation would be expected to occur.

Cross-sectional view 1236 is taken along the axis of travel through the transport device 1230. It shows the bound surface state electron 1202 trapped within a potential well in the excitation region 1218. It also shows a vacuum corridor 1235. In some embodiments, the transport device 1230, the excitation region 1218, and/or the photon emission region 1252 can be maintained within a vacuum.

Cross-sectional view 1238 is taken perpendicularly to the axis of travel through the transport device 1230. It shows that the walls 1233, 1234 of the vacuum corridor 1235. The dimensions of the vacuum corridor 1235 can be selected so as to inhibit spontaneous decay of the excited surface state electron 1202. For example, the vacuum corridor 1235 can form a waveguide whose cutoff frequency is above the frequency of the de-excitation photon 1204. In some embodiments, this may be accomplished when the walls 1233, 1234 of the vacuum corridor 1235 are spaced less than $\lambda/2$ apart, where $\lambda$ is the wavelength of the photon 1204 emitted when the excited surface state electron 1202 transitions to a lower energy level. (In some embodiments, no top wall is necessary to prevent a photon from being emitted vertically if, for example, the dipole moment of the excited electron is vertical such that there is no coupling for vertical emission of a photon.) Other types of waveguides can be used in the transport device 1230 to, for example, inhibit de-excitation of the electron 1202. For example, the transport device may include a waveguide with a photonic band gap at the de-excitation frequency of the excited electron 1202.

Figure 13:
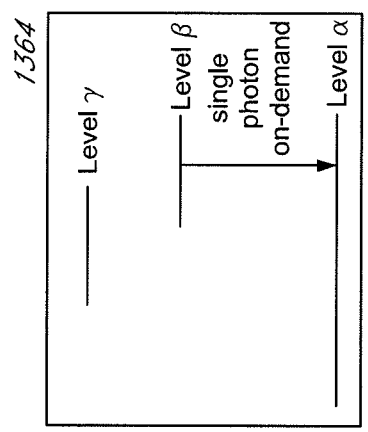
FIG. 13 illustrates an embodiment of a photon emission portion of a single photon source.
Figure 13:
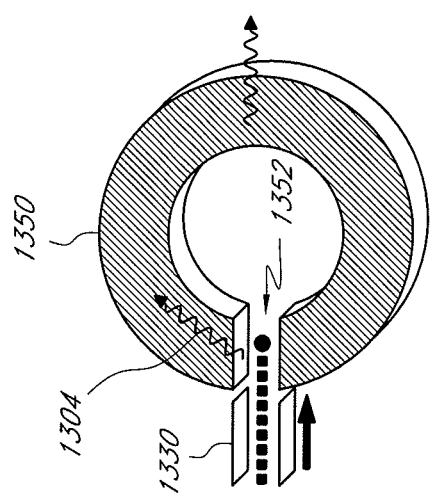

FIG. 13 illustrates an embodiment of a photon emission portion of a single photon source. FIG. 13 shows a transport device 1330 coupled to a photon emission region 1352, as described herein. In some embodiments, the photon emission region 1352 is formed in a photon emission resonant cavity 1350. For example, the photon emission region 1352 can be formed in the space of a missing segment or slot of a photon emission resonant cavity 1350, or in a notch formed in the resonant cavity.

In some embodiments, de-excitation of the surface state electron is induced in the photon emission region 1352 once the electron has been transported there by the transport device 1330. As discussed herein, the surface state electron has been previously raised to an excited energy level. In some embodiments the surface state electron is raised to Level β (e.g., n=2), as illustrated in FIG. 13. Once the electron arrives in the photon emission region 1352, it may be permitted to transition from Level β to Level α spontaneously according to the spontaneous lifetime of the excited state. Alternatively, the excited surface state electron can be induced to undergo, for example, a Level β-to-Level α transition.

As discussed herein, de-excitation can be induced using the Purcell effect. For example, the transition rate of spontaneous decay can be enhanced if the photon emission cavity 1350 exhibits resonance at the wavelength of the photon 1304 that corresponds to the energy gap between Level β and Level α. This enhanced spontaneous decay may also be dependent upon the Q-factor of the photon emission resonant cavity 1350 at the resonance of interest. For example, higher Q-factors can more significantly enhance the transition rate of spontaneous decay than lower. In some embodiments, the Q-factor of the photon emission resonant cavity 1350 is at least $10^4$, or $10^5$, or $10^6$ at the resonance that corresponds to the emitted photon 1304.

With reference to FIG. 7B, de-excitation of a pair of photons can be induced using the Purcell effect by, for example, designing the photon emission resonant cavity 1350 to exhibit resonance at the Level γ-to-Level β and the Level β-to-Level α transitions. In dropping from the Level γ energy level, two photons are emitted (e.g., substantially simultaneously). The first photon is emitted in the transition from Level γ to Level β, while the second photon is emitted in the transition from Level β to Level α. This technique can also be generalized to produce, for example, triplets of entangled photons.

Once the photon 1304 is emitted, in some embodiments it is coupled out of the photon emission resonant cavity 1350. Embodiments of structures and techniques for coupling the photon 1304 out of the photon emission resonant cavity 1350 are described herein with respect to FIG. 15. In some embodiments, the emitted photon 1304 is coupled into a waveguide. The output photon 1304 can then be directed to, for example, the quantum information system to be served by the single photon source.

Figure 14:
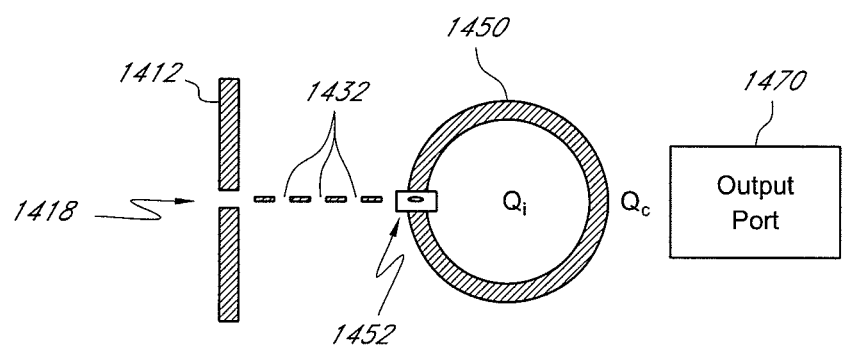
FIG. 14 illustrates the coupling between a photon emission resonant cavity and an output port.

FIG. 14 illustrates the coupling between a photon emission resonant cavity 1450 and an output port 1470. FIG. 14 also illustrates a photon emission region 1452 in a photon emission resonant cavity 1450, a photon excitation region 1418 in a waveguide 1412, and electrodes 1432 used for transporting a bound surface state electron to the photon emission region 1452, as described herein. As also described herein, a single photon is deterministically transferred into the emission resonant cavity 1450 by controlling the arrival of the excited state in the emission region slot 1452.

As illustrated, a Q-factor Q is associated with the photon emission resonant cavity 1450, while a Q-factor $Q_c$ is associated with the coupling between the photon emission resonant cavity 1450 and the output 1470. The Q-factor $Q_i$ is dependent upon, for example, the bending radius of the micro-ring resonator 1450 and the surface roughness of the walls of the waveguide. The Q-factor $Q_c$ is dependent upon, for example, the spacing between the micro-ring resonator 1450 and the output port 1470. The Q-factor $Q_i$ is inversely proportional to the loss within the photon emission resonant cavity 1450, while the Q-factor $Q_c$ is inversely proportional to the loss, or coupling, to the output port 1470.

As discussed herein, the Q-factor $Q_i$ of the photon emission resonant cavity 1450 can be used to enhance the rate of spontaneous decay of the excited surface state electron positioned in the photon emission region 1452. For example, assume that an excited surface state electron with a relatively long spontaneous lifetime (e.g., 200 ns) is inserted into the photon emission region 1452. In some embodiments, the photon emission resonant cavity is made up of a waveguide that is approximately 2 μm×2 μm and formed into a ring having a 30 μm radius. If the photon emission resonant cavity 1450 is designed such that it Q-factor at the resonance corresponding to the photon emitted by the surface state electron is ~1,000,000, for example, then the spontaneous decay lifetime may be reduced to ~1 ns. This enhancement can be quantified by, for example, the following equation:

$$\text{Enhancement\_Factor} = \frac{3Q\lambda^3}{4\pi V}$$

where λ is the wavelength of the emitted photon and V is the volume of the cavity.

This cavity enhancement provided by the Q-factor $Q_i$ can, however, be complicated by introduction of the coupling with the output port 1470 and its associated Q-factor $Q_c$. The Q-factors $Q_i$ and $Q_c$ can be combined to give an effective Q-factor $Q_{eff}$ according to the following equation:

$$\frac{1}{Q_{eff}} = \frac{1}{Q_i} + \frac{1}{Q_c}$$

The following table illustrates the results of a simulation to determine the impact of these Q-factors on the performance of the single photon source in terms of the enhancement factor, while also considering other factors, such as lithographic roughness of the resonator structure, attenuation coefficient, round-trip loss, the coupling ratio between the resonator 1450 and the output port 1470, and the desired gap distance between the resonator 1450 and the output port 1470.

| Lithographic Roughness (nm) | Attenuation Coefficient (dB/cm) | Round-Trip Loss | Coupling Ratio | Desired Gap (nm) | $Q_i = Q_c$ | Enhancement Factor |
|---|---|---|---|---|---|---|
| 200 | 130 | 0.7685 | 0.2315 | N/A | 2400 | 4.32 |
|  | 100 | 0.8166 | 0.1834 | N/A | 3000 | 5.45 |
|  | 70 | 0.8678 | 0.1324 | N/A | 4200 | 7.56 |
|  | 60 | 0.8856 | 0.1144 | N/A | 4800 | 8.74 |
|  | 50 | 0.9037 | 0.0963 | 0 | 5700 | 10.38 |
|  | 40 | 0.9222 | 0.0778 | 24 | 7100 | 12.85 |
|  | 30 | 0.9411 | 0.0589 | 58 | 9400 | 16.96 |
|  | 25 | 0.9506 | 0.0494 | 78 | 11,000 | 20.25 |
|  | 20 | 0.9603 | 0.0397 | 100 | 14,000 | 25.19 |
|  | 15 | 0.9701 | 0.0299 | 135 | 19,000 | 33.42 |
|  | 10 | 0.9800 | 0.0200 | 180 | 28,000 | 49.87 |
|  | 7 | 0.9859 | 0.0141 | 225 | 39,000 | 71.03 |
|  | 4 | 0.9919 | 0.0081 | 288 | 69,000 | 123.93 |
|  | 1 | 0.9980 | 0.0020 | 450 | 270,000 | 494.22 |
|  | 0.7 | 0.9986 | 0.0014 | 480 | 390,000 | 705.81 |
|  | 0.4 | 0.9992 | 0.0008 | 550 | 680,000 | 1234.79 |
| 20 | 0.2 | 0.9996 | 0.0004 | 600 | 1,400,000 | 2469.08 |

In the table, $Q_i$ is made equal to $Q_c$ since this results in the largest effective Q-factor $Q_{eff}$. As illustrated by the table, there is an inverse relationship between the Q-factors ($Q_i$ and $Q_c$), and the coupling ratio to the output port 1470. For example, with reference to the top and bottom lines of the table, if the Q-factors have a relatively high value of 1,400,000, then the coupling ratio to the output port is 0.0004, whereas if the Q-factors have a value of 2400, then the coupling ratio is 0.7685. Depending on the application, the 0.0004 coupling ratio to the output port 1470, for example, may be too low, and it may be undesirable to lower the Q-factors so as to achieve an acceptable higher coupling ratio for extracting the photon.

In some embodiments, it is desirable for the Q-factors $Q_i$ and $Q_c$ to be relatively large so as to provide relatively large enhancement of the rate of spontaneous decay of the excited surface state electron in the resonant cavity 1450. At the same time, it may also be desirable, in some embodiments, to provide a relatively large coupling ratio between the resonant cavity 1450 and the output port 1470. However, there is a design difficulty in that relatively large Q-factors $Q_i$ and $Q_c$ result in a relatively small coupling ratio. This difficulty can be overcome, in some embodiments, by providing a variable coupler to couple the emitted photon from the photon emission cavity 1450 to the output port 1470.

Figure 15:
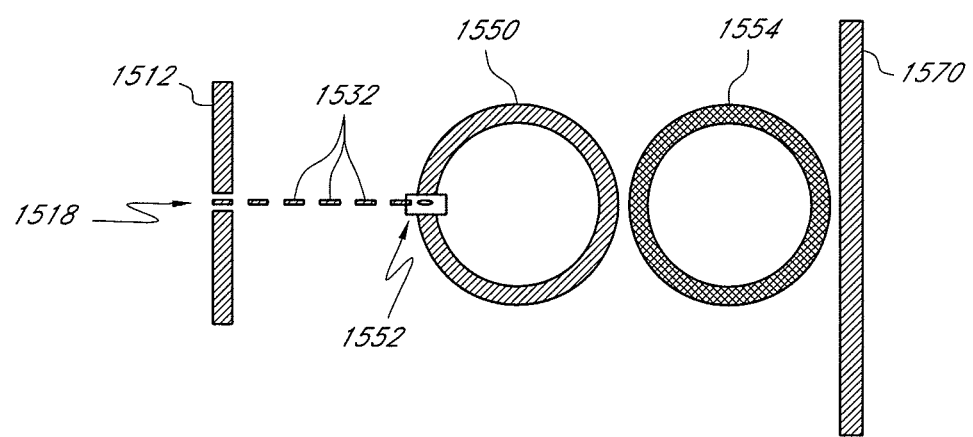
FIG. 15 illustrates an embodiment of a switchable coupler device for controllably coupling a photon emission region to an output waveguide.

FIG. 15 illustrates an embodiment of a switchable coupler device 1554 for controllably coupling a photon emission region 1552 to an output waveguide 1570. In some embodiments, the switchable coupler device 1554 is a micro-ring resonator with tunable resonance, though other switchable coupler devices could also be used. The switchable coupler device 1554 can be used to control the coupling between the photon emission resonant cavity 1550 and the output waveguide 1570. The resonant frequency of the switchable coupler device 1554 can be controlled by, for example, modulating the effective geometry or index of refraction of the device. The effective geometry may be modulated using, for example, thermal effects. The effective index of refraction experienced by a given mode of light energy within the microring coupler device can be altered by, for example, electric, electro-optic, and/or photorefractive effects.

In some embodiments, the switchable coupler device 1554 is made of a semiconductor material, such as silicon. One or more electrodes can be formed in the vicinity of the switchable coupler device 1554 for, injecting charge carriers into the semiconductor material and/or otherwise controlling the distribution of charge carriers within the switchable coupler device. For example, electrodes can be formed above or below the switchable coupler device 1554. Alternatively, electrodes may be embedded within the coupler device, or formed inside or outside the radius of the annular micro-ring structure.

Electric voltages can be applied to these electrodes to manipulate charge carriers within the semiconductor material in ways that change the effective index of refraction of the micro-ring coupler device 1554. Such changes in the effective index of refraction in turn alter the resonance frequency of the device.

In some embodiments, the resonant frequency of the switchable coupler device 1554 can be de-tuned with respect to the resonant frequency of the photon emission cavity 1550. If the resonant frequencies of these two resonant cavities do not correspond with one another, then a photon emitted in the photon emission resonant cavity 1550 will not be coupled into the switchable coupler resonant cavity 1554. When the switchable coupler 1554 is in this de-tuned state, the photon emission resonant cavity 1550 can be effectively isolated from the output waveguide 1570 and from the switchable coupler 1554.

The resonant frequency of the switchable coupler device 1554 can, however, also be tuned to the resonant frequency of the photon emission cavity 1550 using a control signal (e.g., an electric control signal, as described above). When the switchable coupler device 1554 is tuned to the resonant frequency of the photon emission resonant cavity 1550, then the two devices can become effectively coupled to one another. In this tuned state, a photon emitted in the photon emission resonant cavity 1550 can be coupled into the switchable coupler device 1554 and, in turn, to the output waveguide 1570.

While, in some embodiments, the resonant frequency of the switchable coupler device 1554 is biased to the de-tuned state, it can alternatively be biased to the tuned state such the application of the control signal de-tunes the switchable coupler device 1554 with respect to the photon emission resonant cavity 1550 rather than tuning it.

The isolation between the photon emission resonant cavity 1550 and the output waveguide 1570 that is provided by the switchable coupler device 1554 can be beneficial for the following reasons. Namely, the photon emission resonant cavity 1550 can be designed with a relatively high Q-factor $Q_i$ so as to provide an effective enhancement of the rate of spontaneous decay of the excited surface state electron. At the same time, the switchable coupler device 1554 and the output waveguide 1570 can be designed such that their coupling ratio can also be designed to be relatively high such that a photon emitted in the photon emission resonant cavity 1550 can still be efficiently coupled to the output waveguide 1570 when the switchable coupler device 1554 is in the tuned state with respect to the photon emission resonant cavity. The isolation provided by the de-tuned switchable coupler device 1554 allows the Q-factor of the photon emission resonant cavity 1550 and the coupling ratio with the output waveguide 1570 to be designed more independently from one another.

In some embodiments, the switchable coupler device 1554 is de-tuned to reduce the coupling between the photon emission resonant cavity 1550 and the output waveguide 1570, thus preserving the low loss of the photon emission resonant cavity during the de-excitation step. In this way, the photon emission resonant cavity 1550 can take advantage of the Purcell effect to reduce the amount of time required by the excited bound surface state electron to emit a photon. Then, once the photon has been emitted, the switchable coupler device 1554 can be tuned to establish more efficient coupling between the photon emission resonant cavity 1550 and the output waveguide 1570.

With respect to the example given above, the excited surface state electron can be moved into the photon emission region 1552 while the photon emission resonant cavity 1550 is relatively isolated from the switchable coupler device 1554 and the output waveguide 1570 (e.g., the switchable coupler device is in the de-tuned state). Then a controller can wait for approximately 1 ns for a photon to be emitted (or some other amount of time depending upon the spontaneous lifetime of the excited state and the transition enhancement). After this time has elapsed, the controller can output a signal to the tunable coupler device 1554 to re-establish stronger coupling between the photon emission resonant cavity 1550 and the output waveguide 1570 (e.g., the switchable coupler device is placed in the tuned state).

In some embodiments, the photon emission resonant cavity 1550 can be made tunable in a manner similar to what is described with respect to the switchable coupler device 1554. For example, the resonant frequency of the photon emission resonant cavity 1550 can be tuned away from the wavelength that corresponds to the photon emitted in the emission resonant cavity by, for example, an excited surface state electron. In this state, an excited surface state electron deposited in the photon emission region 1552 will be inhibited from undergoing de-excitation. Then, the photon emission resonant cavity 1550 can be tuned, using a control signal, to the resonant frequency that corresponds to the photon. In this state, the excited surface state electron in the photon emission region 1552 can be induced to undergo de-excitation. In view of the tunable resonance of the photon emission resonant cavity 1550 in some embodiments, it may be possible that a separate excitation resonant cavity and a transport device can be foregone. For example, a surface state electron, or other quantum system, can be deposited and excited at the photon emission region 1552 itself while the photon emission resonant cavity 1550 is in the de-tuned state. The photon emission resonant cavity 1550 can then be tuned to the resonance of the surface state electron in order to extract the photon, without requiring physical movement of the surface state electron from a separate excitation region to the photon emission region 1552.

Figure 16:
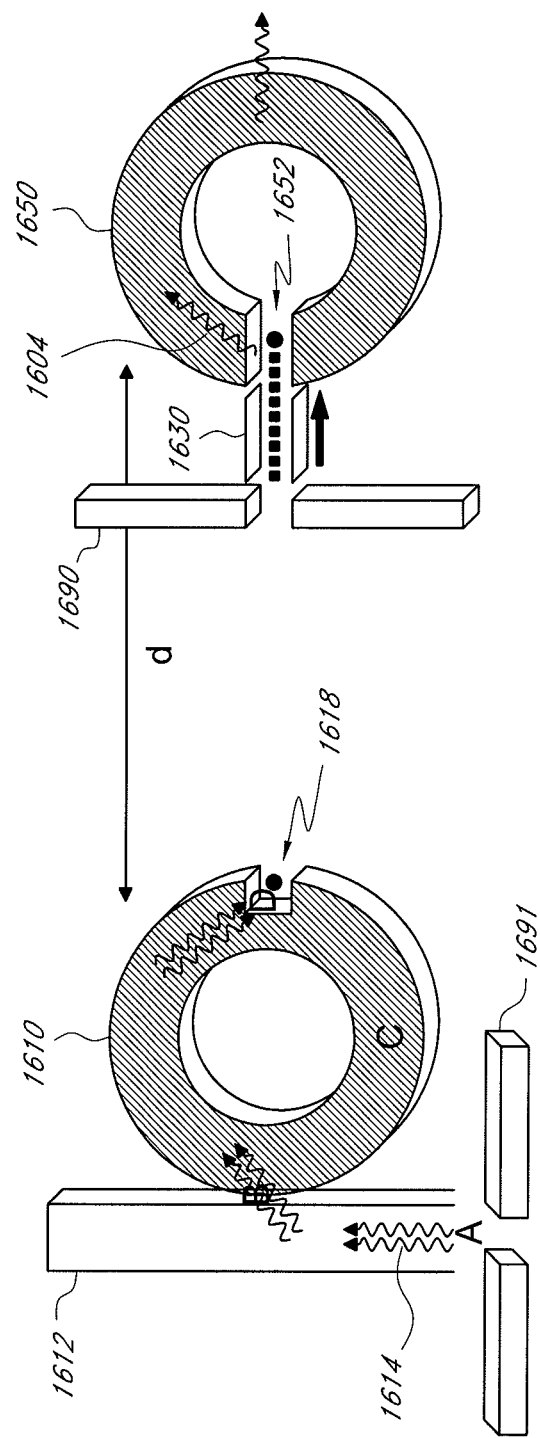
FIG. 16 illustrates possible sources of noise in an embodiment of a single photon source, as well as spatial blocking of optical noise.

FIG. 16 illustrates possible sources of noise in an embodiment of a single photon source, as well as spatial blocking of optical noise. As illustrated in FIG. 16, an excitation resonant cavity 1610 is physically separated from a photon emission resonant cavity 1650. There may still be, however, radiations from the excitation cavity that leak out and propagate in, for example, the 2-D plane of a PLC, and enter the photon emission resonant cavity 1650. These radiations may include: #1 (AC)—spontaneous Raman scattering (SRS); #2 (BCD)—scattering; #3 (D)—re-radiation; #4 (C)—evanescent field; #5 (C)—radiation loss (1/Δn & 1/R); and #6 spontaneous emission in the corridor of the transport device 1630. A, B, C, and D refer to the locations at which each of these radiations are generated (reference the marked locations of A, B, C, and D in FIG. 16).

Processes #2, #4 and #5 are at, for example, the pump frequency, and, under some circumstances, scattering #2 is the dominant radiation. These noise sources can be filtered out, for example, after the photon emission resonant cavity 1650 using a filter that rejects the pump frequency but transmits the emitted photon 1604. Processes #1, #3 and #6 may create photons that fall within the pass band of such an optical filter, but at least #3 and #6 can be reduced through electronic state selection and engineering, respectively.

In some embodiments, at least a portion of any optically coupled radiations in the plane of the single photon source device can be spatially filtered by depositing an absorbing material 1690 with a small hole of, for example, <1 um along the path of the transport device 1630 between the excitation region 1618 and the photon emission region 1652. The absorbing material 1690 can filter out undesired photons while allowing passage of the excited image potential state to the photon emission resonant cavity 1650. Assuming, for example, a separation distance of d=1 mm and two-dimensional propagation of the radiations, in some embodiments, the attenuation due to spatial filtering can be on the order of $\sim 10^{-4}$. In addition, any coupled pump radiation can be suppressed, in some embodiments, by introducing a micro-ring resonator band pass filter with a high rejection ratio after the photon emission resonant cavity 1650. Spatial filters can also be placed elsewhere in the single photon source. For example, a spatial filter 1691 is shown along the path of the excitation radiation 1614 to block scattered excitation radiation.

Figure 17:
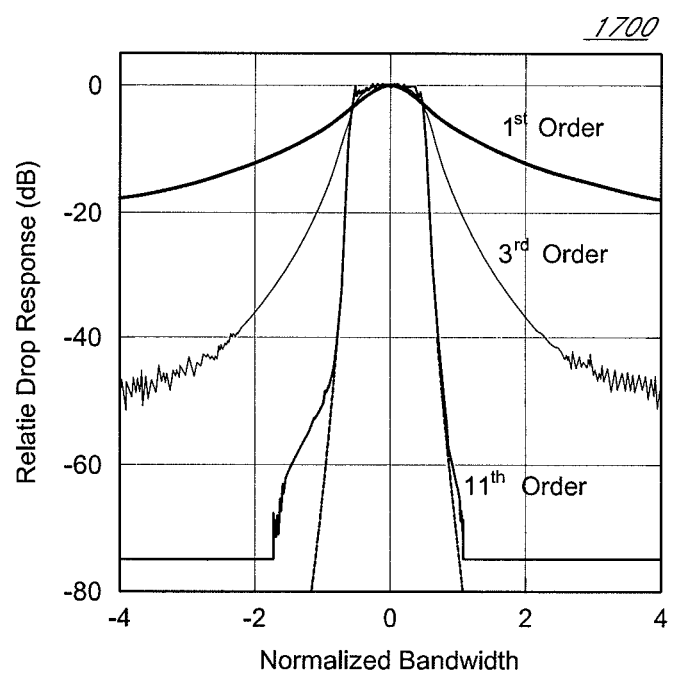
FIG. 17 is a sample plot of the spectral characteristics of a band pass filter for filtering the output of a single photon source.

FIG. 17 is a sample plot 1700 of the spectral characteristics of a band pass filter for filtering the output of a single photon source. The approximately −80 dB rejection of this 11 micro-ring resonator filter (i.e., 11th order) is limited by the floor of the measuring instruments. In some embodiments, this rejection ratio can be extended to better than −120 dB. The pass band of such a filter can be as small as 150 MHz for low order filters. Since, in some embodiments, the micro-ring resonator filter is constructed as part of the same PLC as the single photon source device, the insertion loss may be relatively negligible (<0.1 dB), allowing multiple filters to be cascaded to increase rejection. Cascading of multiple filters at the output of the single photon source may also be useful for suppressing the pass bands that lie beyond the free spectral range (FSR) of the filter by making sure the frequency of two FSRs are not commensurate. Based on the foregoing, it may be possible to achieve an optical filtering of $OF<10^{-12}$.

In some circumstances, the dominant coupled pump radiation is due to scattering. Polymer waveguides can be employed, as can glass PLCs. In some embodiments, the filters show scattering or leakage losses of the order of $10^{-2}$ or less. In some embodiments, the number of photons needed for the STIRAP process is $\sim 10^8$ per micropulse, or $\sim 10^6$ scattered or leaked photons per pulse. In some embodiments, the combination of spatial filtering and a single micro-ring resonator filter can reduce the background noise due to scattering $N_s$ to $N_s<10^{-10}$.

In some embodiments, the circumference of the ring waveguide that forms the excitation resonant cavity 1610 is ~100 μm. Nevertheless, it can still generate spontaneous Raman scattering (SRS) that falls within the band pass of the optical filter OF. In some embodiments, an SRS length of ~100 μm with no resonance effect (i.e. the radiation gets absorbed as soon as it reaches the notch in the excitation resonant cavity 1610) can be assumed. To estimate SRS coupling, an SRS efficiency of $5\times 10\text{-}9/\text{m.sr.cm}^{-1}$ or $1.7\times 10^{-19}/$ m.sr.Hz can be assumed for SiO2; for these values the SRS confined to the waveguide of the excitation cavity 1610 for each picosecond micropulse is $SRS\sim 1.7\times 10^{-15}$ photons/Hz. Combining this with a leakage factor of $10^{-2}$, spatial filtering of $\sim 10^{-4}$ and the filter band pass of 150 MHz, in some embodiments, the background noise from SRS is about $N_{SRS}<3\times 10^{-13}$.

Optical noise is further reduced due to the pulsed operation of the single photon source. Time gating between, for example, excitation pulses and/or photon emission events can be used to block optical noise emitted between such events of interest. Moreover, the foregoing background noise estimates imply continuous operation and, thus, can be viewed as upper bounds of noise performance during pulsed operation.

As indicated by the foregoing background noise analysis, in some embodiments, the background noise of the single photon sources described herein can be much less than the dark count rate of commercial single photon detectors. In addition, in some embodiments, this source and other components for quantum information processing can be integrated with reduced or minimal loss on a single chip.

Figure 18:
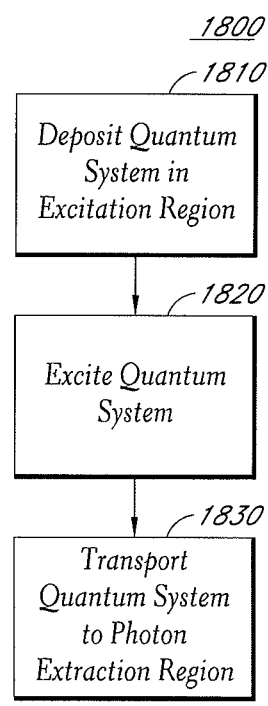
FIG. 18 is a flowchart illustrating a method of operation of a single photon source.

FIG. 18 is a flowchart illustrating a method 1800 of operation of a single photon source. In some embodiments, the method 1800 begins with step 1810 and the deposition of a quantum system in an excitation region, as described herein. Next, at step 1820, the quantum system can be excited to a raised quantum energy level. At step 1830, the excited quantum system can be physically transported to a photon emission region, where a single photon is emitted.

In some embodiments, a controller can be used to issue the command to emit a single photon before or after any of steps 1810, 1820, 1830. For example, in some embodiments, the single photon source may be configured such that a command issued from a controller to emit a photon initiates step 1810. For example, the command to emit a photon could cause an electron source to deposit a bound surface to electron, as described herein. Alternatively, step 1810 can be performed in advance of a command from the controller to emit a photon. For example, a bound surface state electron could be deposited and then simply held pending a future demand from the controller for a photon to be emitted. Instead, such a command from the controller could initiate step 1820 and the excitation of the previously-deposited quantum system.

In still other embodiments, steps 1810 and 1820 could be performed prior to receiving a demand from the controller to emit a photon. The excited quantum system could be prepared and then held (e.g., by inhibiting spontaneous decay, as described herein) pending a command from the controller to emit a photon. In such embodiments, the command from the controller to emit a photon could initiate step 1830 where the quantum system is transported to the photon emission region. In still other embodiments, a command from the controller to emit a photon could initiate the tuning/de-tuning of a tunable photon emission resonant cavity (e.g., 1550) or a switchable coupler device (e.g., 1554). Thus, it may be possible to generate a single photon with differing amounts of elapsed time after actually receiving a demand for the photon depending, for example, on which, if any, steps are pre-performed.

Although this invention has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and subcombinations of the features and aspects can be made and still fall within the scope of the invention. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

What is claimed is:

1. An apparatus for providing a photon on demand, the apparatus comprising:
    a quantum system excitation region configured to spatially localize a quantum system;
    a source of excitation energy coupled to the quantum system excitation region, the source of excitation energy being configured to excite the quantum system from a first energy level to a second energy level;
    a photon emission region that is physically displaced from the quantum system excitation region, the photon emission region being configured to induce the excited quantum system to emit a photon by dropping from the second energy level; and
    a transport device that is configured to controllably, physically transport the excited quantum system from the quantum system excitation region to the photon emission region.

2. The apparatus of claim 1, wherein the quantum system comprises an ion or a bound surface state electron.

3. The apparatus of claim 1, wherein the quantum system excitation region comprises a material that exhibits negative electron affinity.

4. The apparatus of claim 1, wherein the quantum system excitation region comprises an electrode that is configured to create a potential well to spatially localize the quantum system.

5. The apparatus of claim 4, wherein the potential well supports only a single instance of the quantum system.

6. The apparatus of claim 1, wherein the photon emission region is configured to induce the excited quantum system to emit the photon in a period of time that is substantially shorter than the spontaneous lifetime of the excited quantum system.

7. The apparatus of claim 1, wherein the photon emission region comprises a resonant cavity that has a resonance that corresponds to the photon emitted when the excited quantum system drops from the second energy level.

8. The apparatus of claim 7, wherein the photon emission region comprises a micro-ring resonator.

9. The apparatus of claim 1, wherein the transport device comprises a bucket brigade device.

10. The apparatus of claim 1, wherein the transport device comprises a plurality of electrodes configured to create a movable potential well for physically transporting the excited quantum system.

11. The apparatus of claim 1, wherein the transport device is configured to inhibit the excited quantum system from dropping from the second energy level.

12. The apparatus of claim 11, wherein the transport device comprises a waveguide, the waveguide having a cutoff frequency that inhibits the excited quantum system from dropping from the second energy level by emitting the photon.

13. The apparatus of claim 1, wherein the quantum system comprises a bound surface state electron, and wherein the quantum system excitation region comprises a resonant cavity that does not have a resonance that corresponds to the photon emitted when the bound surface state electron drops from the second energy level.

14. The apparatus of claim 1, wherein the first energy level is the ground state energy level of the quantum system.

15. The apparatus of claim 1, wherein the photon emission region is coupled to an output port by a switchable coupler, the switchable coupler being configured to vary coupling between the photon emission region and the output port in response to a coupling control signal.

16. The apparatus of claim 15, wherein the coupling control signal causes charge carriers within the switchable coupler to move.

17. The apparatus of claim 15, wherein the switchable coupler comprises a tunable micro-ring resonator.

18. The apparatus of claim 1, wherein the source of excitation energy comprises a light source that is configured to generate first light energy corresponding to the energy difference between the first energy level and the second energy level, and to generate second light energy corresponding to the energy difference between the second energy level and a third energy level.

19. The apparatus of claim 18, wherein the light source is configured to generate a pulse of the second light energy first in a temporal sequence, and to generate a pulse of the first light energy second in the temporal sequence, the pulses of the first and second light energy overlapping.

20. The apparatus of claim 1, wherein the material comprises a semiconductor.

21. The apparatus of claim 1, further comprising a controller for providing a command signal to emit the photon, wherein the command signal is configured to cause the quantum system excitation region to be populated with the quantum system.

22. The apparatus of claim 1, further comprising a controller for providing a command signal to emit the photon, wherein the command signal is configured to cause the transport device to physically transport the excited quantum system from the quantum system excitation region to the photon emission region.

23. The apparatus of claim 1, further comprising a controller for providing a command signal to emit the photon, wherein the command signal is configured to cause the source of excitation energy to excite the quantum system.

24. The apparatus of claim 15, further comprising a controller for providing a command signal to emit the photon, wherein the command signal is configured to cause the switchable coupler to increase coupling between the photon emission region and the output port.

* * * * *